US012699946B2

(12) United States Patent
Zhao

(10) Patent No.: US 12,699,946 B2
(45) Date of Patent: Aug. 4, 2026

(54) AUTO-ASSIGNMENT OF NEW ENTITIES IN A HIERARCHICAL STRUCTURE WITH AUTOMATIC HIERARCHY EXTENSIONS USING GENERATIVE ARTIFICIAL INTELLIGENCE

(71) Applicant: Oracle International Corporation, Redwood Shores, CA (US)

(72) Inventor: Yu Zhao, Cambridge, MA (US)

(73) Assignee: Oracle International Corporation, Redwood Shores (CA)

( * ) Notice: Subject to any disclaimer, the term of this patent is extended or adjusted under 35 U.S.C. 154(b) by 1 day.

(21) Appl. No.: 18/886,446

(22) Filed: Sep. 16, 2024

(65) Prior Publication Data
US 2026/0080347 A1 Mar. 19, 2026

(51) Int. Cl.
| | |
|---|---|
| *G06Q 30/00* | (2023.01) |
| *G06Q 10/0631* | (2023.01) |
| *G06Q 10/067* | (2023.01) |
| *G05B 19/418* | (2006.01) |

(52) U.S. Cl.
CPC ....... *G06Q 10/067* (2013.01); *G06Q 10/0631* (2013.01)

(58) Field of Classification Search
CPC ........................ G06Q 10/067; G06Q 10/0631
See application file for complete search history.

(56) References Cited

U.S. PATENT DOCUMENTS

| | | | |
|---|---|---|---|
| 12,210,839 B1 * | 1/2025 | Burton .................. G06F 40/30 |
| 2024/0386015 A1 * | 11/2024 | Crabtree ............. G06F 16/9024 |
| 2025/0258852 A1 * | 8/2025 | Crabtree ............. G06F 16/3344 |

OTHER PUBLICATIONS

"Empowering Large Language Models to Set up a Knowledge Retrieval Indexer via Self-Learning". IEEE. 2024. (Year: 2024).*
"Zero-Shot and Few-Shot Learning With Knowledge Graphs: A Comprehensive Survey". IEEE. 2023. (Year: 2023).*

(Continued)

*Primary Examiner* — Maria V Vanderhorst
(74) *Attorney, Agent, or Firm* — Mughal Gaudry & Franklin PC

(57) ABSTRACT

The present disclosure relates to an automatic assignment of new entities in an existing hierarchical structure by leveraging retrieval-augmented generation (RAG) that improves the performance of a generative artificial intelligence (AI) model by generating a suggested hierarchical structure. For an automatic assignment, a user input may be received that may include a hierarchical structure and a query for adding one or more new entities to the existing hierarchical structure. For each new embedding vector associated with the query for adding a new entity, a retrieval-augmented generation may generate a context from the hierarchical structure based on a relevance to the query, and an additional context from a knowledge base. The retrieval-augmented generation may input a human-readable prompt, combining query with the context, additional context and a system prompt, to the generative AI model such as a large language model for generating the suggested hierarchical structure.

20 Claims, 13 Drawing Sheets

100

102

104

Evaluation Results

(56)           References Cited

OTHER PUBLICATIONS

Cevahir, A. et al., "Large-scale Multi-class and Hierarchical Product Categorization for an E-commerce Giant", Proceedings of COLING 2016, the 26th International Conference on Computational Linguistics: Technical Papers, pp. 525-535, Osaka, Japan, Dec. 11-17, 2016.
Ferreira Maia, W. et al., "Multi-level Product Category Prediction through Text Classification", arXiv:2403.01638v1, Mar. 5, 2024.
Oh et al., "Utilizing global and path information with language modelling for hierarchical text classification", 2013. Journal of Information Science, 40(2), 127-145. Sage Publications, Inc. https://doi.org/10.1177/0165551513507415 (Original work published 2014).
Xue et al., "Deep classification in large-scale text hierarchies", 2008. In Proceedings of the 31st annual international ACM SIGIR conference on Research and development in information retrieval (SIGIR '08). Association for Computing Machinery, New York, NY, USA, 619-626. https://doi.org/10.1145/1390334.1390440.
Zhou, J. et al. "Hierarchy-Aware Global Model for Hierarchical Text Classification", Proceedings of the 58th Annual Meeting of the Association for Computational Linguistics, pp. 1106-1117, Jul. 5-10, 2020.

* cited by examiner

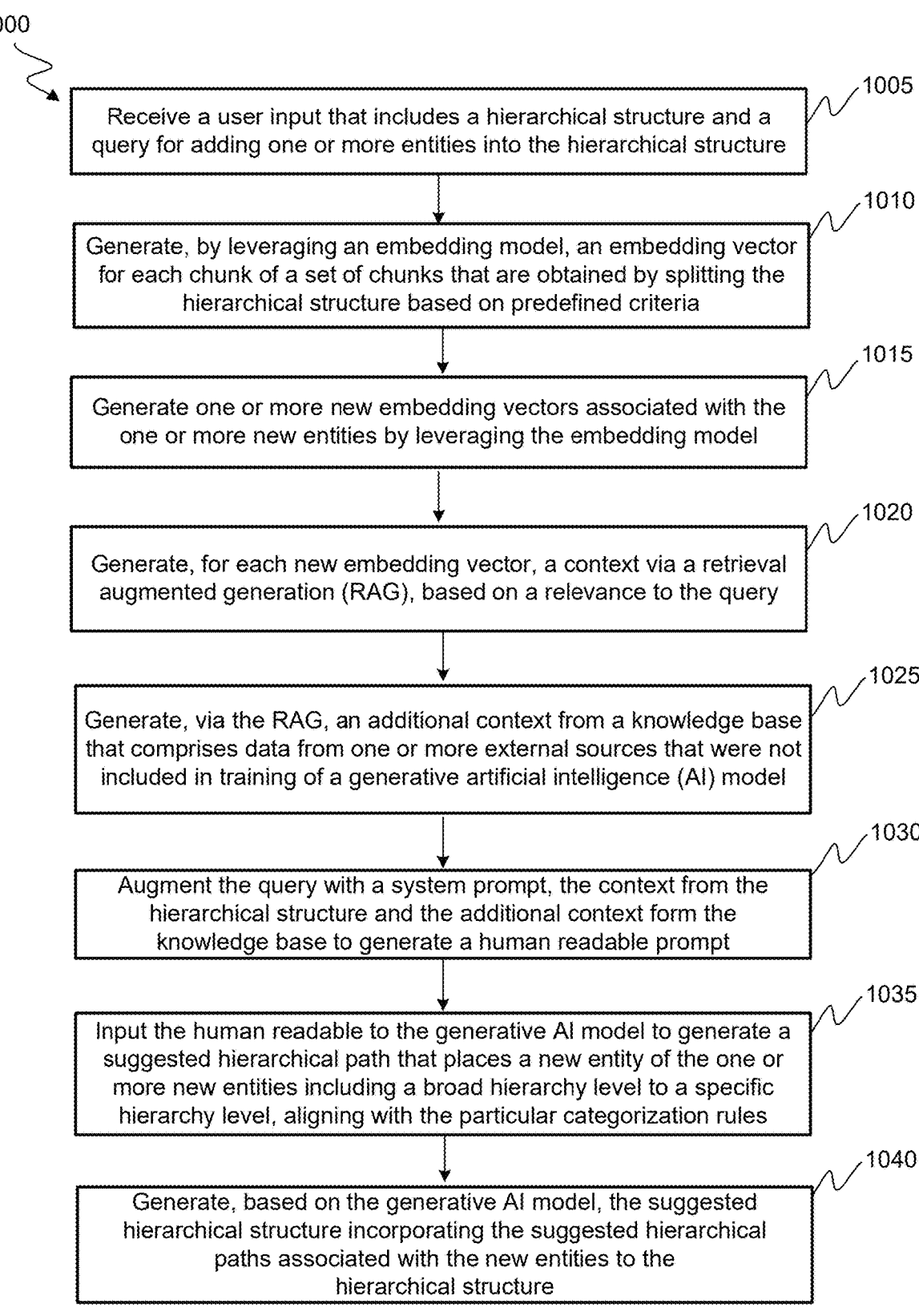

1000

Receive a user input that includes a hierarchical structure and a query for adding one or more entities into the hierarchical structure　　1005

Generate, by leveraging an embedding model, an embedding vector for each chunk of a set of chunks that are obtained by splitting the hierarchical structure based on predefined criteria　　1010

Generate one or more new embedding vectors associated with the one or more new entities by leveraging the embedding model　　1015

Generate, for each new embedding vector, a context via a retrieval augmented generation (RAG), based on a relevance to the query　　1020

Generate, via the RAG, an additional context from a knowledge base that comprises data from one or more external sources that were not included in training of a generative artificial intelligence (AI) model　　1025

Augment the query with a system prompt, the context from the hierarchical structure and the additional context form the knowledge base to generate a human readable prompt　　1030

Input the human readable to the generative AI model to generate a suggested hierarchical path that places a new entity of the one or more new entities including a broad hierarchy level to a specific hierarchy level, aligning with the particular categorization rules　　1035

Generate, based on the generative AI model, the suggested hierarchical structure incorporating the suggested hierarchical paths associated with the new entities to the hierarchical structure　　1040

*FIG. 10*

AUTO-ASSIGNMENT OF NEW ENTITIES IN A HIERARCHICAL STRUCTURE WITH AUTOMATIC HIERARCHY EXTENSIONS USING GENERATIVE ARTIFICIAL INTELLIGENCE

BACKGROUND

Hierarchical structures are used in a wide range of applications, spanning from corporate organizational structures to complex database schemas. A hierarchical structure may be characterized by one or more hierarchies in which an entity—a distinct unit or component whether it refers to an individual item, concept, organization, a department within a corporation, a person that occupies a specific level or role within the hierarchy, or a node in a data hierarchy—may exist in a defined relationship with other entities. The assignment of these entities, within a relevant hierarchy, is done such that each entity is accurately positioned at its appropriate level and with correctly defined relationships to other related entities. This accurate placement of an entity in a hierarchy can help in maintaining an organized and efficient structure, which may directly impact the integrity of data integrity and functionality of the hierarchical system. By systematically assigning entities, defining complex relationships, and generating consistent rules, an effective navigation and querying of relevant hierarchies can be managed. This approach of organizing information in a hierarchical data structure may not only support better data organization but also improve decision-making processes by providing a coherent framework for analyzing and utilizing information. Furthermore, it may simplify the process of making updates or changes, as any modifications to a hierarchy are easily traceable and integrated into the existing hierarchical structures.

Despite its advantages, the assignment of new entities in a hierarchy can present significant challenges, particularly in complex or dynamic hierarchies with intricate relationships and dependencies. For example, incorporating new entities often requires consideration of existing categorization rules and associated logic for a consistent alignment with the existing hierarchy. Typically, assignment of entities is performed manually that may be time-consuming and prone to human error, which can lead to misplacements or inconsistencies within the hierarchy. As the hierarchy becomes more complex, managing assignments manually becomes an increasingly difficult task, risking inefficiencies and potential data integrity issues. Scalability and flexibility in configuring rules may also be a concern for efficiently managing and processing an ever-increasing number of entities, without degrading the performance of the hierarchical system, to manage diverse organizational needs and hierarchical variations. In general, manual processes cannot scale to cope with frequent changes or updates, leading to slower response times in dynamic environments.

Additionally, manual assignment of entities may lack transparency and may not provide accurate provenance for the information or a rationale behind each decision or suggestion. Consequently, without maintaining a document trail, a provenance audit cannot be conducted of specific assignments to better understand the rationale of doing them. This lack of transparency can make the auditing of processes a challenge, and complicate troubleshooting of the hierarchical structures, which as a result, reduces trust in its dependability and reliability. The absence of a document trail that maintains accurate records of all changes, can make it tediously difficult to efficiently and effectively review or revise assignments, impacting the overall accountability of the system, which subsequently hampers the ability of an organization to make informed adjustments or improvements. Moreover, hierarchical structures lack evaluations to validate the correct assignment of entities, leading to hierarchies that may comprise entities with invalid or incorrect assignments.

SUMMARY

Certain aspects and features of the present disclosure relate to automatic assignment of new entities to an existing hierarchical structure by leveraging a retrieval-augmented generation (RAG) to improve performance of a generative artificial intelligence (AI) model. For automatic assignment, a user input may be received that may include a hierarchical structure, used interchangeably hereinafter with the term "existing hierarchical structure", and a query for adding one or more new entities to the existing hierarchical structure. New entities may be input as text or images, where the images may be processed to identify names of the new entities using a machine-learning model (e.g., pre-trained convolutional neural networks (CNN) or a vision transformer). The existing hierarchical structure may comprise hierarchy levels that are assigned hierarchy names in which entities may be arranged with associated categorization rules (i.e., arranged in categories and subcategories resulting in a tabular or tree-like structure). The hierarchical structure may be input in various file formats e.g., comma-separated values (CSV), or spreadsheet.

The hierarchical structure may be processed for splitting the hierarchy into relevant segments or chunks based on predefined criteria (e.g., delimiters such as commas, semicolons, cells, rows or columns). These chunks may be given as input to an embedding model to generate embedding vectors—numerical representations that may be stored in a (specialized) database such as a vector database (DB) (e.g., Oracle DB 23ai, Chroma DB or Milvus DB type systems) for efficiently querying, comparing and retrieving relevant chunks for subsequent processing. The embedding vectors associated with each chunk may capture hierarchy names, hierarchy levels, semantic meanings, relationships between different chunks, and the associated categorization rules which are followed in the existing hierarchical structure. Similarly, preprocessing may also be performed for generating one or more new embedding vectors associated with the one or more new entities by leveraging the embedding model. For each new embedding vector, associated with the query for adding a new entity, a retrieval-augmented generation (RAG) may generate a context based on a relevance to the query. In context generation, RAG may compare each new embedding vector with the stored embedding vectors associated with the chunks, retrieving relevant embedding vectors, which have a semantic similarity with the new embedding vector that exceeds a particular similarity threshold. The semantic similarity between two embedding vectors may be measured by a similarity metric such as Euclidean distance, Manhattan distance or a cosine similarity etc.

Retrieval-augmented generation may generate an additional context from a knowledge base that comprises data from external sources, not included in the training data of a generative artificial intelligence (AI) model, such as a large language model (LLM). The knowledge base may include multiple application programming interfaces (APIs) and data sources e.g., domain-specific databases and/or proprietary databases, web sources, technical documents industry standards, or repositories. The aim of retrieval-augmented generation may also be to enhance the performance of the generative AI model by providing contexts from the existing hierarchical structure and the knowledgebase so that the generative AI model can answer queries of a user efficiently and accurately. Therefore, a human-readable prompt may be generated for querying the generative AI model by augmenting the query (for adding one or more new entities) with a system prompt, context from the hierarchical structure and the additional context from the knowledgebase. Based on the human-readable prompt, the generative AI model may output a suggested hierarchical structure that may include one or more suggested hierarchical paths in the existing hierarchical structure for each new entity. The suggested hierarchical paths may include a placement of the new entity from a generic (highest) hierarchical level to a specific hierarchical level, maintaining adherence or alignment to the categorization rules of the existing hierarchical structure.

In some examples, the existing hierarchical structure may not have appropriate hierarchy levels (or categories) to incorporate new entities, in accordance with the context of the existing hierarchical structure or an additional context from the knowledge base. To address this, the generative AI model may suggest extending the hierarchy by adding new hierarchy names (or categories) at one or more hierarchy levels such that the new entity is positioned accurately, conforming to the existing categorization rules of the hierarchical structure. The suggested hierarchical extensions may involve introducing new hierarchy levels or new hierarchy categories within the existing hierarchy levels, starting at a broad hierarchy level and refining its position through more specific categories while maintaining consistency and coherence in the hierarchical structure. Additionally, the techniques, as disclosed herein, may also generate source information that may include references to one or more sources (e.g., existing hierarchical structure, or sources from the knowledgebase), which the generative AI model may have used to derive suggestions for hierarchical paths associated with the new entities. The provenance information may provide transparency by revealing the origins of hierarchical suggestions, enabling users to understand how and why certain categorizations or extensions were proposed, which may also help in finding errors by identifying if the suggestions are based on outdated or incorrect data.

In some aspects of the present disclosure, evaluations may be performed on the suggested hierarchical structure that may include a hierarchical relationship check for the (suggested) hierarchical path corresponding to the new entity. Similarly, the suggested hierarchical structure can be evaluated for name and format accuracy, validating correctness of the names and formats at each level, within the hierarchical path, as suggested by the generative AI model for a given new entity. For instance, the evaluation may identify issues such as non-alphabetic characters (e.g., '[', '*', '/') or misspelled names. In some instances, one or more identified issues (e.g., those issues having a predicted significance above a pre-defined threshold) may be auto-corrected or processed to generate a proposed correction (e.g., in a post-processing phase).

Additionally, the suggested hierarchical structure can be assessed for severity levels (i.e., categorizing the seriousness of errors according to predefined criteria e.g., as, "none", "low", "medium", "high" and "critical") to identify the impact of errors (or issues). These severity levels may help prioritizing issues based on their impact on the accuracy of the suggested hierarchy, such as labeling "critical" for the hierarchical structural failures (i.e., placing a new entity in an incorrect hierarchy) and "low" for minor inconsistencies such as grammatical or typographical errors.

In some other aspects, the evaluation results may include vertical accuracy that assesses the success rate of correctly placing each new entity by evaluating the associated suggested hierarchical paths from the lowest to the highest level or vice versa. This metric determines if the hierarchical paths (from one end to other hierarchy level) are valid, where a valid hierarchical path may refer to a sequence of hierarchical levels with correct relationships with neighboring hierarchy levels. The vertical accuracy may also determine that the hierarchy levels in the suggested hierarchical path accurately reflects the associated categorization rules or shows no relationship errors. Additionally, the evaluation results may include horizontal accuracy that measures the success rate at each individual hierarchical level independently, focusing on how many entities are correctly assigned within a specific hierarchical level, without considering the levels above or below.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product tangibly embodied in a non-transitory machine-readable storage medium, including instructions configured to cause one or more data processors to perform part or all of one or more methods or processes disclosed herein.

In some embodiments, a system is provided that includes one or more means to perform part or all of one or more methods or processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures:

FIG. 10 illustrates an exemplary workflow for the auto-assignment of the one or more entities to the existing hierarchical structure.

DETAILED DESCRIPTION

Figure 1:
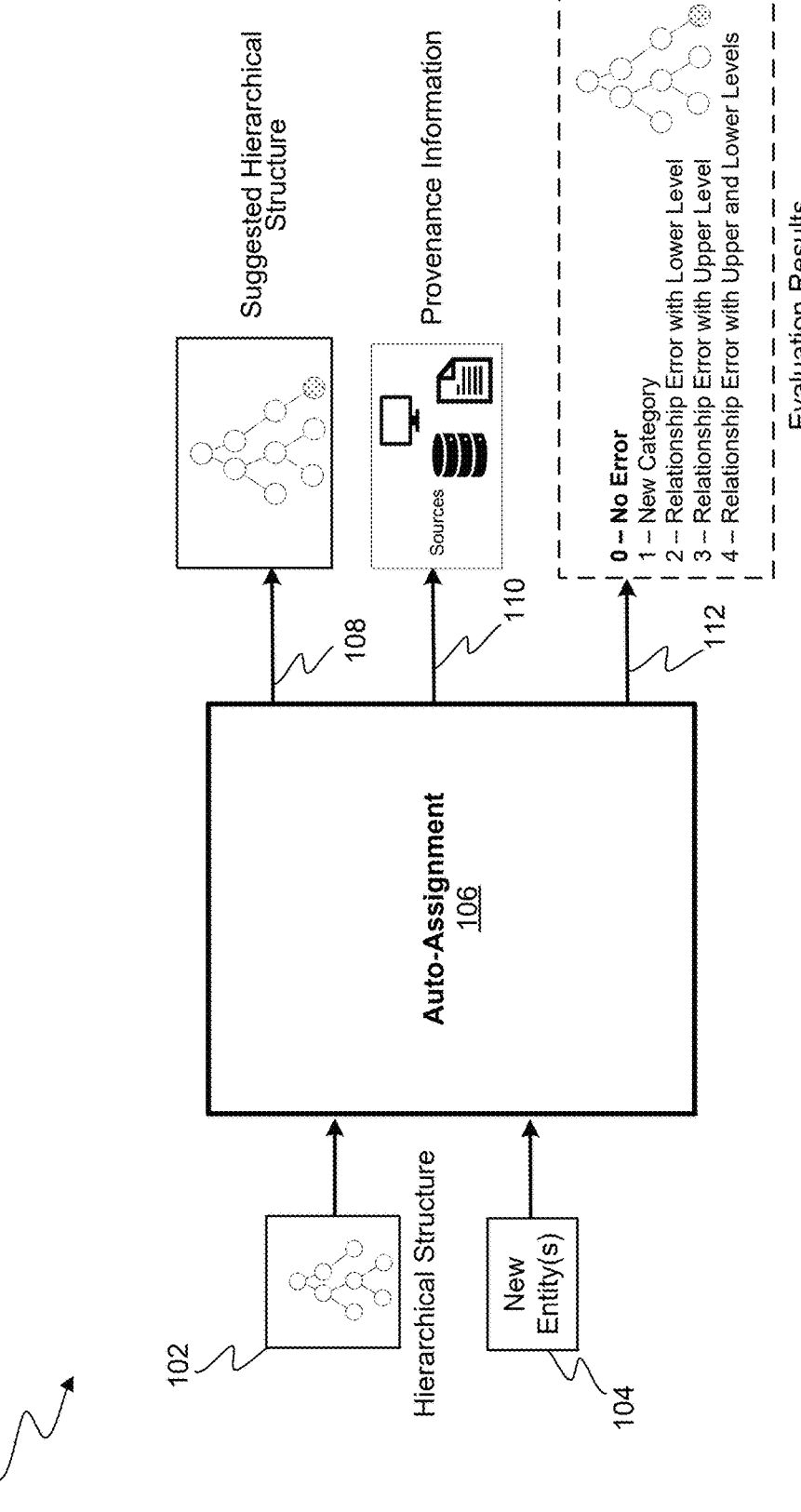
FIG. 1 depicts an exemplary network for adding one or more entities in an existing hierarchical structure by leveraging disclosed auto-assignment techniques that may generate a suggested hierarchical structure.

The present disclosure relates to an automatic assignment of new entities in an existing hierarchical structure by leveraging retrieval-augmented generation that improves the performance of a generative artificial intelligence (AI) model for generating a suggested hierarchical structure. The disclosed techniques may perform automatic assignment, also termed hereinafter as auto-assignment, of new entities by taking a user input including, the existing hierarchical structure and a user query for adding one or more new entities into the existing hierarchical structure. New entities may be input in textual and/or image format that may be first processed to identify names of the new entities using an image identification model such as a machine-learning model (e.g., a pre-trained convolutional neural network (CNN) or a vision transformer). The existing hierarchical structure, interchangeably used with a hierarchical structure, may comprise hierarchical levels that are assigned hierarchy names in which entities may be arranged by applying one or more associated categorization rules (i.e., arranged in categories and subcategories resulting in a tabular or a tree-like structure). For example, a categorization rule may place, in a hierarchical structure, entities (e.g., RAM and cache) under a hierarchy name, "memory devices", and other entities (e.g., hard disk drives (HDD), optical discs) under a different hierarchy name, "storage devices". The hierarchical structure may be input in various file formats e.g., a comma-separated values (CSV) or a spreadsheet.

The auto-assignment techniques, as disclosed herein, may add new entities accurately and instantly (e.g., in less than 10 seconds) into an existing hierarchical structure. This may involve automatically determining a position for the new entity in the existing hierarchy, configuring attributes and relationships that are aligned with the categorization rules of the existing hierarchy and/or similar hierarchies, while maintaining the consistency and coherence. The auto-assignment techniques may include dividing the hierarchical structure into smaller sub-structures, or relevant chunks using a splitting (or chunking) technique (e.g., recursive text splitting, segment-based splitting or sliding window splitting) that uses predefined criteria such as delimiters (e.g., comma, semicolon, new line, row or column and/or periods), maximum chunk size, fixed chunk size or semantic boundaries. These chunks may be transformed into corresponding embedding vectors by leveraging an embedding model including, but not limited to, BERT (bidirectional encoder representations from transformers), or its variants such as RoBERTa, an enhancement of BERT. Additionally, models such as GPT (Generative Pre-trained Transformer), T5, FastText, GloVe (global vectors for word representation) or customized CNN can be utilized for generating embedding vectors through fine-tuning on specific hierarchical structures. The embedding vectors can be high-dimensional numeric vectors and may capture hierarchical levels (including categories and subcategories), their semantic meanings, contextual relationship and categorization rules across various hierarchical levels in the hierarchies of the specific hierarchical structures. These embedding vectors may be stored in a vector database for efficient searching, retrieval, and querying.

Once a hierarchical structure is stored, similar processing may be performed for new entities that may involve generating new embedding vectors for each new entity by the embedding model. For each new embedding vector, the retrieval-augmented generation may generate a context by retrieving embedding vectors from the vector database that are closest, in a semantic space, to the query embedding vector, allowing for contextually relevant responses and/or subsequent processing. Retrieval-augmented generation may compare each new embedding vector with the stored embedding vectors associated with the chunks, retrieving relevant embedding vectors based on a similarity metric (e.g., Euclidean distance or cosine similarity). The retrieval process may identify or access embedding vectors with similarity scores exceeding a predefined threshold, indicating relevance of these embedding vectors to the query that includes the new entity. The retrieval-augmented generation may further access a knowledge base for generating an additional context referring to relevant information that may not be part of the hierarchical structure. The additional context may involve domain-specific knowledge that can help in categorizing similar data in other relevant sources. The knowledge base may include data sources, such as domain-specific databases and/or proprietary databases, web sources, technical documents industry standards, or repositories that were not included in training data of a generative AI model such as a large language model (LLM).

The retrieval-augmented generation may aim to improve the performance of generative AI models by providing supplementary information from an existing hierarchical structure (including context or relevant chunks) and knowledge base (including additional context). This supplementary information may allow the LLM (or chatbots powered by LLMs) to address user queries more effectively. To achieve this, a human-readable prompt may be crafted by enriching the query—potentially incorporating new entities, a system prompt, contextual information from both the hierarchical structure and the knowledge base, thereby improving the accuracy of the response of the LLM. The system prompt may direct the LLM to generate hierarchical values for a new entity, from the most specific level (the bottom hierarchy level) to the most general level (the top hierarchy level), or vice versa, while adhering to the existing hierarchical structure. The LLM may process this human-readable prompt to generate an updated or suggested hierarchical structure that includes a hierarchy path for each new entity. This process may generate the updated hierarchical structure to be contextually accurate by incorporating specific hierarchical details from the vector database and a relevant logic from similar technologies in the knowledge base.

In some examples, an existing hierarchical structure may lack appropriate hierarchy levels (or categories) to accommodate new entities. To address this, the disclosed auto-assignment techniques may recommend or suggest extending the hierarchy by introducing new categories at one or more hierarchy levels, thereby placing the new entity at an accurate position in a hierarchy level by conforming to existing categorization rules of the hierarchical structure. The hierarchy extensions may involve introducing new hierarchy levels, starting with the new entity at a broad (generic) level and refining its position through more specific categories to maintain consistency and coherence in the hierarchical structure. Additionally, the auto-assignment techniques may also generate provenance information that may include references to specific sources e.g., existing hierarchical structure, or sources from the knowledge base comprising documents, datasets, web sources or pages from which an LLM can infer hierarchical suggestions. The provenance information may provide transparency by disclosing the origins of hierarchical suggestions, enabling users to better understand the rationale behind proposed categorizations or extensions. This transparency may aid in detecting errors, as users can identify if the suggestions are based on outdated or incorrect data. Furthermore, availability of the provenance information, with sources cited, may help to better evaluate the relevance, reliability of the suggestions, and alignment with current data and contextual needs.

In some aspects of the present disclosure, various evaluations may be performed on the suggested hierarchical structure, involving quality control and error measurements. For example, the evaluation results may include a hierarchical relationship check for a hierarchical path, in a suggested hierarchical structure, corresponding to the query of adding a new entity. For example, if a suggested hierarchical structure includes three hierarchy levels arranged as, "education centers (Level-3)→country (Level-2)→schools, college (Level-1)", the evaluation results may output a relationship error either between Level-2 and Level-1 or Level-3 and Level-2. Similarly, the suggested hierarchical structure can also be evaluated for name and format accuracy of various hierarchy names. This may involve checking whether the names and formats are correct at each level within the hierarchy path as suggested by the LLM for a given new entity. For instance, the evaluation may identify issues such as non-alphabetic characters (e.g., '@', '#', '/') or misspelled names. Subsequently, one or more post-processing techniques may be performed to correct any detected issue or suggest such a correct. Such a correction or suggestion may (in some instances) be conditioned upon a magnitude of the issue and/or a confidence of a suggestion. Further, the suggested hierarchical structure can be assessed for a severity level check to identify the impact of errors (or issues) and provide explanations for each error. The severity levels may categorize how critical different errors are according to predefined criteria e.g., labeling "none", "low", "medium", "high" and "critical". In evaluating the hierarchical structure, these severity levels may help prioritize issues based on their impact on the accuracy of the suggested hierarchy, such as labeling "critical" for hierarchical structural failures and "medium" for formatting issues.

In some other aspects, evaluation results may include a vertical accuracy metric that measures the success rate of correctly placing each new entity at its correct level by evaluating a hierarchy path from the lowest to the highest level, or vice versa. This metric determines the validity of hierarchical paths suggested for the new entities (from the bottom to the top hierarchy level). For example, vertical accuracy may be determined by counting the total number of valid hierarchical paths relative to the total hierarchical paths in the suggested hierarchical structure, where a valid hierarchical path may refer to a path showing no relationship error between various hierarchical levels included in the hierarchical path. Additionally, the evaluation results may include a horizontal accuracy metric that measures the success rate of correctly assigning categories to the new entities at a given hierarchical level only, ignoring the hierarchical levels above or below the given hierarchical level.

FIG. 1 depicts an exemplary network 100 for adding one or more entities in an existing hierarchical structure 102 by leveraging, as disclosed, auto-assignment techniques 106 that may generate a suggested hierarchical structure 108. In this exemplary network 100 a user e.g., an administrator, a manager, a domain expert or a developer may provide a user input to auto-assignment techniques 106, such that the user input may include an existing hierarchical structure 102 and a query for adding one or more new entities 104 into the existing hierarchical structure 102. New entities 104 may be input by providing names in a textual format, or alternatively, by providing images that may be first processed to identify names of the entities. For identifying the name of an entity in a given image, an image identification model may be used e.g., a customized or pre-trained convolutional neural network (CNN) (e.g, AlexNet, VGGNet, ResNet or R-CNN) that is fine-tuned to recognize specific entities in the given image.

Existing hierarchical structure 102 can be represented in various formats to define hierarchical levels and relationships between entities in a hierarchical structure. For example, in a hardware hierarchy, a computer system can be represented as a hierarchical structure, comprising multiple components: the motherboard, which houses various modules such as the CPU, RAM, and storage drives. Each of these components may further include subcomponents, such as individual memory chips or specific storage partitions. Hierarchical relationships can be captured using different formats e.g., a CSV (comma-separated values) file might list components and the associated parent-child relationships in a simple tabular form, while XML (eXtensible Markup Language) or JSON (JavaScript Object Notation) may allow for a detailed nesting of attributes to represent specific features of components, and also relationships between components. Similarly, spreadsheet formats (e.g., Excel) or hierarchical databases can visually or structurally store a hierarchy providing detailed insights into the organization of the hierarchical structure, enabling its efficient and effective management.

Auto-assignment techniques 106 may process the user input including the existing hierarchical structure 102 and the query and may generate one or more outputs including a suggested hierarchical structure 108 along with other information such as provenance information 110 and evaluation results 112. The suggested hierarchical structure 108 may include suggested hierarchical paths that includes placements of new entities at appropriate hierarchical levels (from the highest level representing generic entities to the lowest level representing specific entities) within existing hierarchical structure 102 by adding new branches or extensions to existing hierarchical structure 102. Auto-assignment techniques 106 may also leverage a generative AI model to determine the placement of entities, and therefore the provenance information 110 may provide relevant information or sources that are used by the generative AI model. Evaluation results 112 may provide validations for suggested hierarchical structure 108, including quality control and error measurements. Auto-assignment techniques 106 may verify that a current hierarchy level in a suggested hierarchy path for an entity shows "no error," indicated by a number '0', signifying that the entity aligns with the current hierarchy level.

In some examples, auto-assignment techniques 106 may not find an appropriate placement of a new entity in the existing hierarchical structure 102. As a result, a hierarchy extension or introduction of a new category at one or more hierarchy levels may be proposed. For such hierarchy extensions at a given hierarchical level, evaluation results 112 may have '1', signifying the addition of a new category. Evaluation results 112 may also include relationship checks for the suggested hierarchy path. For example, a value of '2' may indicate a mismatch of the current hierarchy level with the hierarchy level below it, a value of '3' may represent a mismatch of the current hierarchy level with the hierarchy level above it, and a value of '4' may indicate a mismatch of the current hierarchy level with the hierarchy levels both above and below the current hierarchy level. It may be understood that although evaluation results 112 are shown using numbers, these may also be presented with other visual cues, such as colors or visual markers, for a better understanding.

Figure 2:
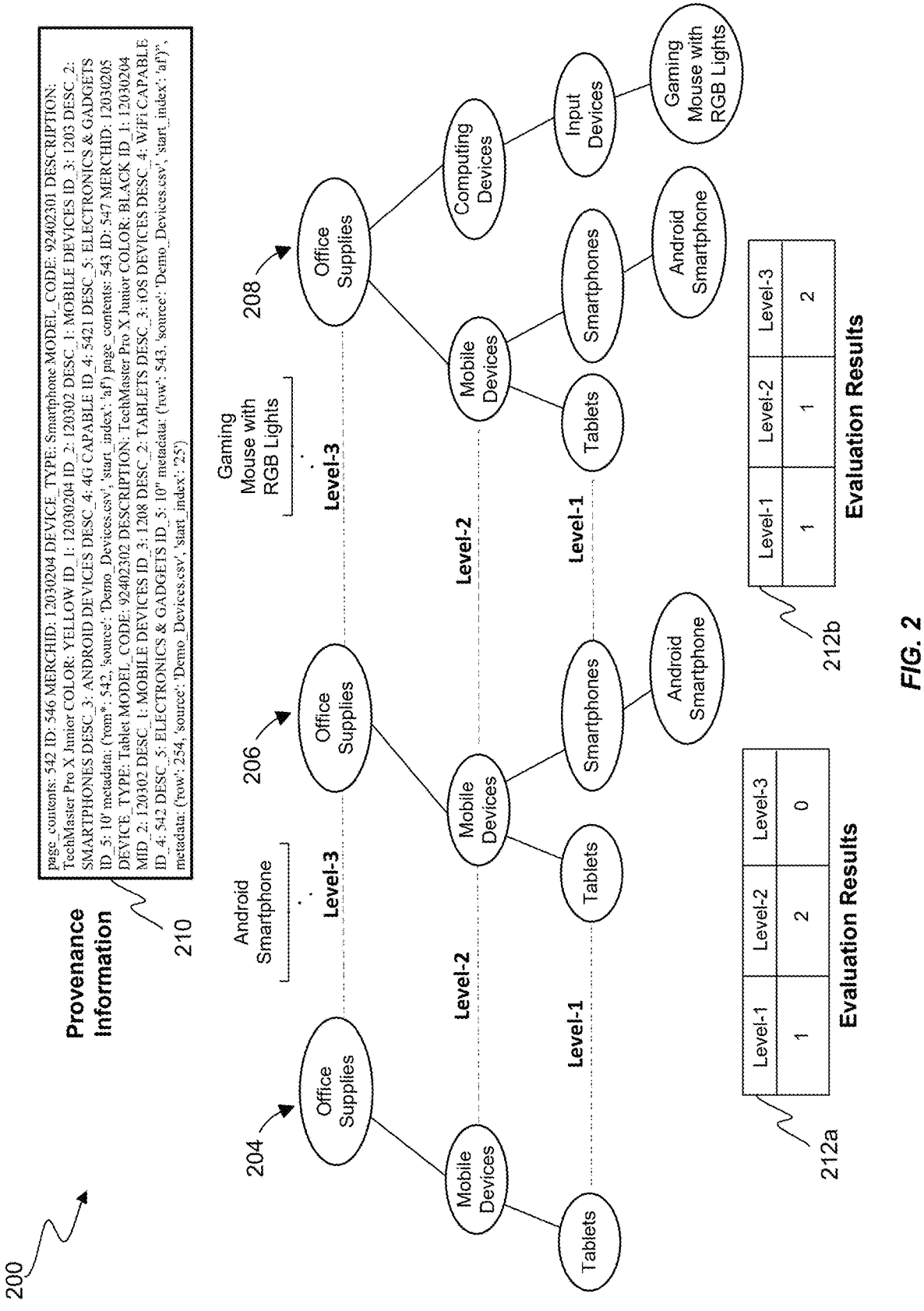
FIG. 2 shows an illustrative example for adding the one or more entities in the existing hierarchical structure by the auto-assignment techniques.

FIG. 2 shows an illustrative example 200 of adding one or more entities to an existing hierarchical structure using one or more auto-assignment techniques 106, as disclosed herein. For example, to add a new entity, "Android Smartphone", to an existing hierarchical structure 204, auto-assignment techniques 106 may generate a suggested hierarchical structure 206 by suggesting a hierarchy path as, "Office Supplies→Mobile Devices→Smartphones". Provenance Information 210 may include references to specific sources e.g., existing hierarchical structure 204, or other sources including datasets, web sources or pages, which auto-assignment techniques 106 may use to infer a suggested hierarchical path for the new entity (e.g., "Android Smartphone"). Evaluation results 212a provide a validation indication for each hierarchical level in the suggested hierarchy path for the new entity (e.g., "Android Smartphone"). These results can be evaluated at each level of the hierarchy, which is numbered from the top level (representing the total number of levels, such as 3 levels in this example) down to the bottom level in the hierarchy path. It should be understood that the evaluations of a suggested hierarchy path may be performed in various ways and in either direction i.e., from top hierarchy level to bottom hierarchy level or vice versa.

For example, the evaluation results 212a are performed from the bottom hierarchy level, where the new entity is inserted into the suggested hierarchy path, up to the top hierarchy level. A result value of '1' at Level-1 indicates that a new category (e.g., "Android Smartphone") has been added under the entity "Smartphones" at Level-1. At Level-2, a result value of '2' signifies a relationship error due to a mismatch with the lower hierarchy level (Level-1). This error represents an inconsistency, as "Smartphones" is a new category that did not previously exist in the hierarchy path, and thus, "Mobile Devices" was not in a relationship with it. At Level-3, a result value of '0' indicates "no error," meaning that the current hierarchy level does not exhibit any relationship errors with the lower hierarchy levels. In some instances, an evaluation algorithm can be defined and/or used in a top-down manner or (e.g., alternatively) in a bottom-up manner. It will be appreciated that—in either instance—the evaluation can assess both an upper level (if any) and a lower level (if any), and such evaluations of multiple levels may even be performed at a same time. In some examples, auto-assignment techniques 106 may directly assign "Android Smartphone" under "Mobile Devices" without proposing a new entity name.

For adding another new entity, "Gaming Mouse with RGB Lights", auto-assignment techniques 106 may suggest a hierarchy extension in the existing hierarchical structure 204 at Level-2, creating a new subcategory at Level-2 as "Computer Devices", as no suitable category already exists in the existing hierarchical structure 204. In the evaluation table 212b, a result value of '1' for Level-1 and Level-2 indicates a hierarchy extension at these levels. In contrast, a result value of '2' for Level-3 signifies a relationship error, consistent with the evaluation strategy described above. The hierarchy extension is done using auto-assignment techniques 106 that may add another subcategory as "Input Devices" and the new entity (e.g., "Gaming Mouse with RGB Lights") is placed under this subcategory and hierarchical structure 208 is the new suggested hierarchical structure. Auto-assignment techniques 106 may suggest new categories and subcategories after doing a thorough analysis of similar categories and related entities within comparable technologies. For example, provenance information 210 may include detailed descriptions of relevant devices, other similar technologies, the criteria used for their classification, and references to elements within existing hierarchical structure 206. Provenance Information 210 may provide transparency which helps not only in detecting errors but also enabling users to determine whether suggestions are made based on outdated or incorrect data. Furthermore, by providing insights from the sources and references included in provenance information 210, users can identify any potential discrepancies or gaps, enabling informed changes to the existing hierarchical structure 204. This approach may also help in maintaining an up-to-date, consistent and coherent categories for entities within the hierarchical structure for incorporating a new entity.

Figure 3:
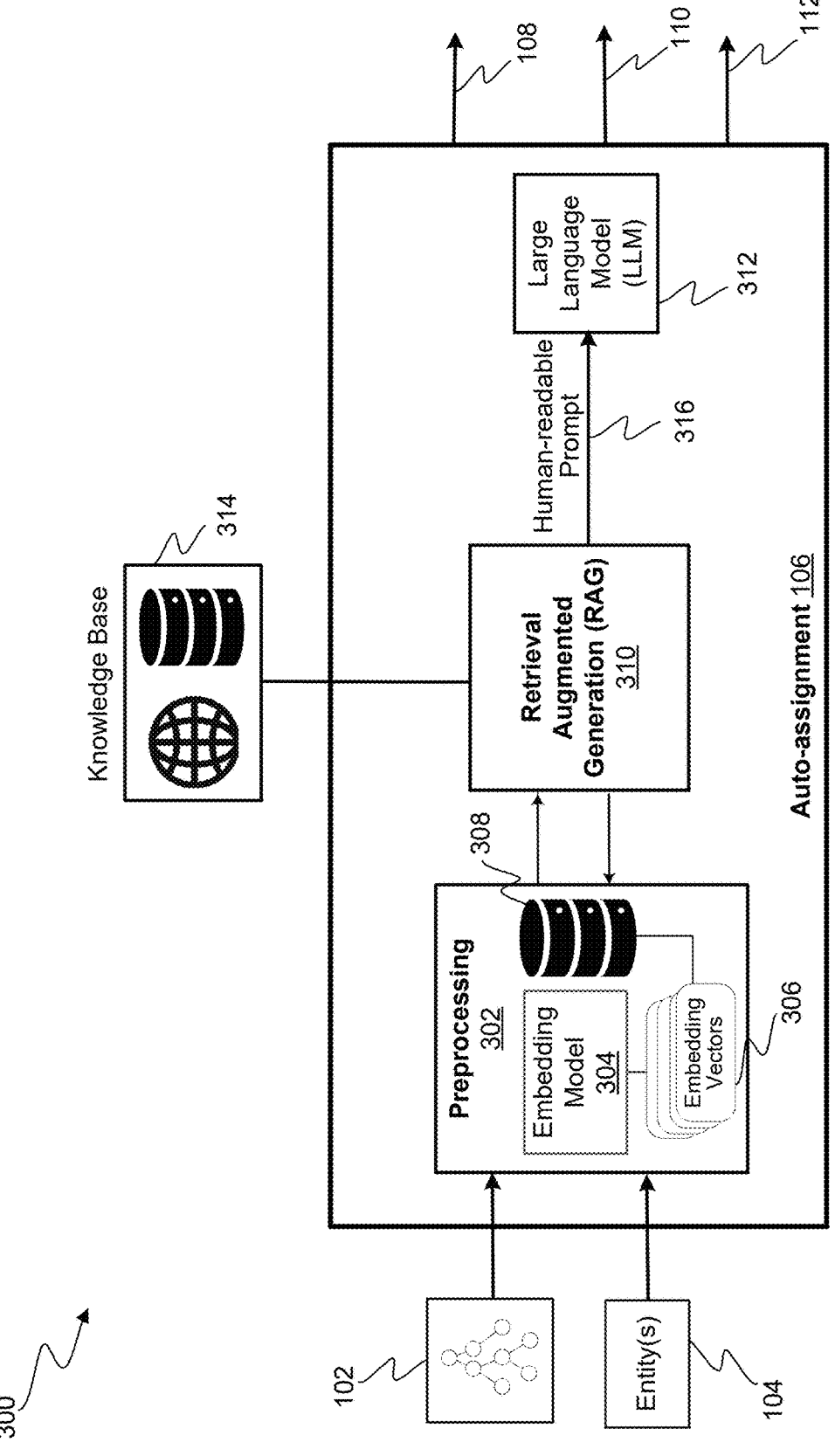
FIG. 3 illustrates a detailed block diagram for the auto-assignment of the one or more entities in accordance with some aspects of the present disclosure.

FIG. 3 illustrates a detailed block diagram 300 for auto-assignment of new entities in accordance with some aspects of the present disclosure. Auto-assignment techniques 106 may include preprocessing 302, retrieval-augmented generation (RAG) 310, a knowledge base 314 including one or more domain-specific databases, and a generative artificial intelligence (AI) model, such as a large language model (LLM) 312. LLMs are typically trained on bulk amounts of publicly available datasets that may lack domain-specific knowledge for certain domains (e.g., advanced robotics, cyber security threat intelligence, retail, or marketing). Therefore, when dealing with domain-specific knowledge and hierarchical organization tasks, large language model 312 may struggle with specialized or unique classification rules because these rules may not have been learnt from training on the publicly available general purpose web training datasets. This lack of domain-specific knowledge may result in inaccurate or irrelevant responses when trying to classify entities into hierarchical levels for a specific domain that requires a new logic. For example, in the context of software development, a hierarchy may categorize all software tools with "manager" under the name "project management tools". However, there can be some hierarchies where a software tool named, "task manager", is better suited under other categories e.g., "system utilities" rather than "project management tools". Without a domain-specific knowledge, LLMs may incorrectly classify these entities, leading to inaccuracies and inconsistencies in categorizing of entities.

Auto-assignment techniques 106, as disclosed herein, may address this problem by leveraging retrieval-augmented generation (RAG) 310 that augments additional knowledge or relevant information to a user input for enhancing the performance of a large language model (LLM) 312 for specialized tasks. The user input may include an existing hierarchical structure 102 in a tabular format (e.g., a CSV file or a spreadsheet) comprising various hierarchy levels and a user query (e.g., for adding new entities 104 (text or images) to the existing hierarchical structure 102). The goal of RAG 310 may be to create bots (or chatbots powered by LLMs) that can answer user queries in various domain-specific contexts by cross-referencing to a knowledge base 314 that may comprise new domain-specific data outside of original training dataset on which the large language model 312 was trained. The knowledge base 314 may include multiple data sources, such as databases, web sources or document repositories. Retrieval-augmented generation (RAG) 310 may offer a mechanism for augmenting user queries with the context from existing hierarchical structure 102 and an additional context from knowledge base 314 for prompting large language model 312 and/or large multi-modal models (LMMs).

In some aspects, auto-assignment techniques 106 may preprocess the existing hierarchical structure 102 at block 302 that may involve dividing a given hierarchy into smaller sub-hierarchies. As a result, more specific and relevant splits or chunks are generated that are given as input to an embedding model 304 to generate embedding vectors 306, which are high-dimensional numerical representations that can be stored, efficiently queried and retrieved from a vector database 308 (e.g., Oracle DB 23ai, Chroma or Milvus database). The embedding vectors 306 may capture individual categories, subcategories, semantic relationships between them, the rules to categorize entities, or exceptions allowing to understand the chunks for subsequent processing. Moreover, the conversion to embedding vectors 306 may provide an efficient comparison and a quick access to the relevant hierarchies, that might provide the context for preserving relationships. Once the existing hierarchical structure 102 is embedded in the vector database 308, similar preprocessing 302 may also be performed for one or more new entities, thereby converting user queries into new embedding vectors, representing the semantic meaning of queries (or prompts) in a high-dimensional space.

The new embedding vectors, generated from a query, are compared to the embedding vectors of stored chunks by using similarity metrics such as cosine similarity or Euclidean distance. If the value of a similarity metric for a stored chunk is above a predefined threshold, it may be selected and forwarded to a large language model 312 for doing an inference. Based on this comparison, RAG 310 may select only top k relevant chunks, with embeddings closest to the new embeddings that are associated with the query, to generate a context. In some instances, RAG 310 may employ embedding models like transformers with encoder-decoder architectures (e.g., T5 or GPT) to generate additional text, which may include categories, subcategories, entity attributes, and categorization rules that are highly relevant to the context of a query. The generated context may then be used to create detailed, human-readable prompt 316, which may enhance the ability of the large language model 312 to produce responses that are not only accurate but also contextually relevant.

Human-readable prompt 316 may include the query augmented with a system prompt, context from the existing hierarchical structure 102 and additional context (domain-specific knowledge) from the knowledge base 314. Knowledge base 314 may inform as to how similar technologies that are categorized in other relevant sources such as industry standards, proprietary databases, technical documents, web scraped data (e.g., from similar or relevant websites or web pages, blogs, and forums), social media insights (e.g., reviews, feedback, trends and discussion that might provide additional context). For example, in a hardware classification, it may include data on how different components such as processing unit (e.g., central processing unit (CPU) or graphical processing unit (GPU)), memory, peripherals (e.g., input/output devices) are categorized within a computer system, and how these components may be associated with other categories such as accessories or devices (e.g., electronic or mechanical). RAG 310 may retrieve the relevant hierarchical data from the knowledge base 314 for a new entity and may use this additional context to inform the LLM 312. This retrieval step may enable the auto-assignment techniques 106 to understand the specific classification logic used in knowledge base 314.

The system prompt may instruct the large language model 312 to create the hierarchical level values for the new entities 104 from the top hierarchical level to the bottom (or vice versa), while maintaining adherence of each level to the logic of the existing hierarchical structure 102. As a result, large language model 312 may better understand the hierarchical structure and associated logic without the need of prompting one level value at a time. For adding another new entity, "Hybrid memory cube (HMC)", auto-assignment techniques 106 may suggest a hierarchy extension in an existing hierarchical structure 204 by creating a new sub-category namely "advance memory solutions" and adding it at Level-1 under an existing entity, "Computing Devices". The existing subcategories of "Memory devices" and "Storage devices" may not appropriately match with characterization of HMC, as it is a high-performance memory device that combines dynamic random-access memory (DRAM) and logic circuitry in a single substrate. The resultant system prompt for this hierarchy extension may be of the form: "Generate a complete hierarchy for a 'Hybrid memory cube (HMC)' starting from the lowest level to the highest level by following specific rules of categorization of entities in an input hierarchical structure. If a new entity is not semantically similar to any of the existing categories, generate new categories at one or more hierarchical levels and add the new entity under these new categories." In some instances, the context from the hierarchical structure may simply be the relevant chunks that closely match the new entity name. While, in some other instances, the context from hierarchical structure 102 may also include additional text explaining the characteristic of the entity: e.g., "The entity 'Hybrid memory cube (HMC)' is described as a next-generation memory technology that integrates both memory and storage functions. In the existing hierarchy, traditional RAM is categorized under 'memory devices', while SSDs and HDDs are categorized under 'storage devices'. No existing category specifically covers hybrid memory-storage solutions."

There may be additional context or insights that may be retrieved via RAG 310 from knowledge base 314, such as rules or exceptions that are relevant to the categorization of a new entity from external sources. Large language model 312 may output the suggested hierarchical structure 108 as, "Computing devices→Advanced memory solutions (a new subcategory at Level-1)→Hybrid memory cube (HMC) (a new subcategory at Level-2)". It may be understood that, if the hierarchical structure 102 is not already defined, the auto-assignment techniques 106 can dynamically construct the hierarchical structure 102 by incorporating new entities 104 based on the additional context from the knowledge base 314.

Figure 4:
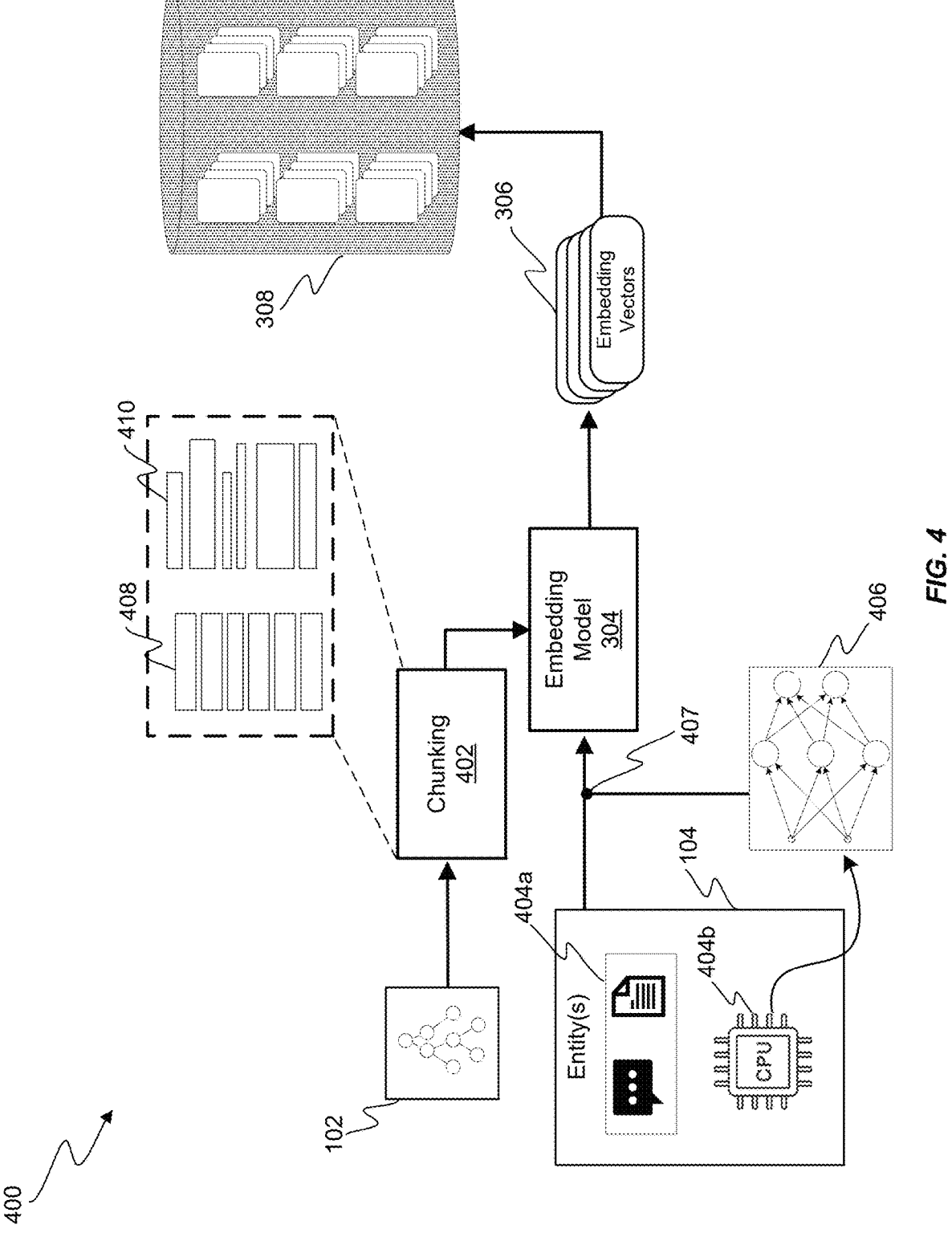
FIG. 4 depicts an exemplary network of preprocessing from the FIG. 3 for storing the existing hierarchical structure in a vector database.

FIG. 4 depicts an exemplary network 400 illustrating preprocessing 302 from the FIG. 3 for storing a hierarchical structure 102 in a vector database 308. The user input including one or more queries for adding one or more new entities 104 may be a textual description of entity names 404a or an entity image 404b. For identifying the name of an entity from the entity image 404b, an image identification model 406 may be used. A customized or pre-trained convolutional neural network (CNN) that can be fine-tuned to recognize specific entities in an image using one or more example networks, such as AlexNet, VGGNet, ResNet or R-CNN. Alternatively, a vision transformer (ViT) may classify or identify an entity within an image. For example, for the given entity image 404b, the image identification model 406 may predict the entity name as "central processing unit". After processing the entities 104, the one or more queries to the embedding model 304, at 407, may be given in a text format. Before inputting the hierarchical structure 102 to the embedding model 304, chunking 402 may be performed that involves breaking down the hierarchical structure 102 into smaller and manageable text chunks based on certain criteria.

The purpose of chunking 402 may be to preserve the context of the hierarchical structure 102 by maintaining coherence and semantics in each chunk with that of the hierarchy of hierarchical structure 102. To achieve this, chunking 402 can utilize various chunking methods: e.g., a recursive text splitting method progressively partitions the hierarchical data of the hierarchical structure 102 into smaller chunks based on predefined strategies: (1) all chunks are of the same fixed (or maximum) size chunks 408; or (2) chunks may be of various sizes that are dynamically determined based on semantic boundaries 410. This approach may be effective for retaining the context and meaning of hierarchical. Other chunking methods may involve segment-based chunking and sliding window chunking, which create overlapping chunks from the hierarchical data, thus preserving the context and relationships across chunk boundaries. The criteria for chunking typically include delimiters (e.g., commas, semicolons, new lines, rows, columns, or periods), the length of text and semantic boundaries. These criteria may help in systematically dividing hierarchical structure 102 into manageable segments, such as categories and subcategories, while maintaining the hierarchical and semantic integrity of each chunk.

The chunks can then be transformed, by an embedding model 304, into corresponding embedding vectors, that are numeric vectors that can act as multi-dimensional maps to capture various hierarchical levels, semantic meanings of the hierarchical levels, contextual relationships and to measure similarity across various hierarchical levels. For instance, chunks describing different levels of a hierarchy or distinct categories within the hierarchical structure 102 may be encoded in such a way that their vector representations reflect their relative positions and relationships. Embedding vectors 306 may then be stored in vector database 308, which may organize them based on their semantic similarity. The vector database 308 may be used by retrieval-augmented generation (RAG) 310, enabling efficient searching and retrieval of relevant chunks based on their embeddings. When a query for adding one or more entities is given, retrieval-augmented generation RAG 310 may retrieve embedding vectors 306 from vector database 308 that have a higher semantic similarity (according to a given semantic similarity metric) to the embedding vector of the given query, enabling context aware and contextually relevant responses to the entered query. Various embedding models can be used for this purpose, including BERT (bidirectional encoder representations from transformers), which excels in capturing contextual meaning, or its specialized variants or enhancements such as RoBERTa. Additionally, transformer models like GPT (Generative Pre-trained Transformer), T5, FastText, GloVe (global vectors for words representation) or similar models can be utilized for generating embedding vectors 306 that can capture both semantic meaning and hierarchical relationships once they are fine-tuned on specific hierarchical tasks.

Figure 5:
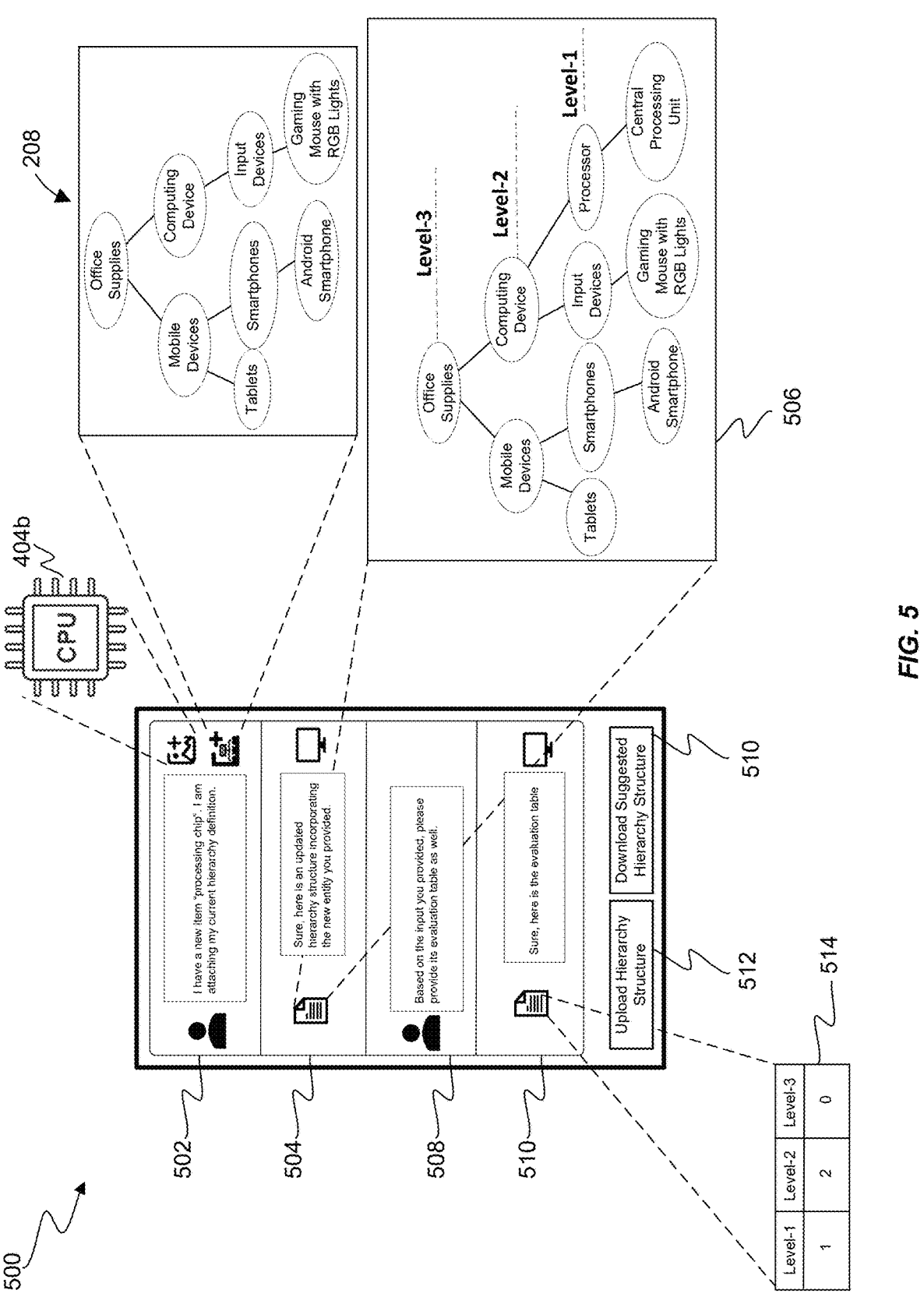
FIG. 5 shows an exemplary user interface in accordance with some aspects of the present disclosure.

FIG. 5 shows an exemplary user interface 500 in accordance with some aspects of the present disclosure. The user e.g., (operator, administrator or a manager) may enter a given query, providing entity names in a textual form directly or embedded within the given query. The query could take a form of a sentence or question such as illustrated in the block 502. Alternatively, or additionally, the user may upload an entity image 404b from the user interface 500. As a result, a given query may also be a compound query which includes one or more entities in text formats, or one or more photo images of one or more entities, or both. Similarly, a hierarchical structure 208 may be uploaded in a comma-separated value (CSV) file, a spreadsheet or similar hierarchical forms. Auto-assignment techniques 106 may utilize an image identification model 406 to analyze the entity image 404b and determine an appropriate entity name for the entity in the entity image 404b. Image identification model 406 processes the content of the entity image 404b to generate distinct features and characteristics to identify the object in the entity image 404b. Consequently, image identification model 406 may generate a prediction for the entity name of the detected entity. As a result, auto-assignment techniques 106 can efficiently and accurately assign names to new entities, if their photo images are available.

The auto-assignment techniques 106 may process the provided entity names (from the image or the query) and collect relevant information such as context from the hierarchical structure 208 and additional contexts from the knowledge base 314 via the retrieval-augmented generation RAG 310. Once relevant information is collected, the retrieval-augmented generation RAG 310 may generate human-readable prompt 316 by augmenting a given query with a system prompt and generating the context from hierarchical structure 208 and knowledge base 314. The system prompt may instruct the large language model (LLM) 312 to determine, appropriate hierarchical levels for one or more new entities, all at once while maintaining that each hierarchy level determined for the one or more new entities are coherent with the semantics and relationships of the existing hierarchical structure 208. The human-readable prompt 316 may be input to the LLM 312, and corresponding output of large language model 312 is shown at block 504 of the user interface 500. Large language model 312 may provide an output and a suggested hierarchical structure 506 by suggesting extension in the hierarchy of existing hierarchical structure 208 at Level-1. For example, in output 506, large language model 312 may suggest a new hierarchy extension from the entity named "Computing Device". Output 506, provided by the auto-assignment techniques 106 in the user interface 500, may be downloaded using a download option 510 in the form of a CSV file, spreadsheet or other similar file formats.

In some aspects, the current disclosure may provide evaluation results 514 of the suggested hierarchical structure that may include a hierarchical relationship check for a suggested hierarchical path corresponding to a new entity. Similarly, the suggested hierarchical structure can be evaluated for name and format accuracy, validating correctness of the names and formats at each hierarchy level, within the hierarchy path, as suggested by the large language model 312 for a given new entity. For example, a user may inquire (e.g., as illustrated in block 508) about providing evaluation results 112 for suggested hierarchical structure 506. In response, the auto-assignment techniques 106 may generate evaluation results 514 that may provide evaluations for each hierarchy level of the suggested hierarchy path for the new entity starting from the lowest (specific) to the highest (general) hierarchy level. For example, suggested hierarchical structure 506 has three levels, Level-3 being the highest and Level-1 being the lowest. An evaluation result of '1' at Level-1 shows a suggested new category at Level-1, which may also indicate that the hierarchy name, "Processor" does not exist at this level. Similarly, an evaluation value of '2' for the hierarchy Level-2 indicates a relationship inconsistency, as "Processor" is a new category that did not previously exist in the hierarchy path, and thus, "Computing Devices" is not in a relationship with it. At Level-3, a result value of '0' indicates "no error," meaning that the current hierarchy level does not exhibit any relationship errors with the lower hierarchy levels.

Figure 6:
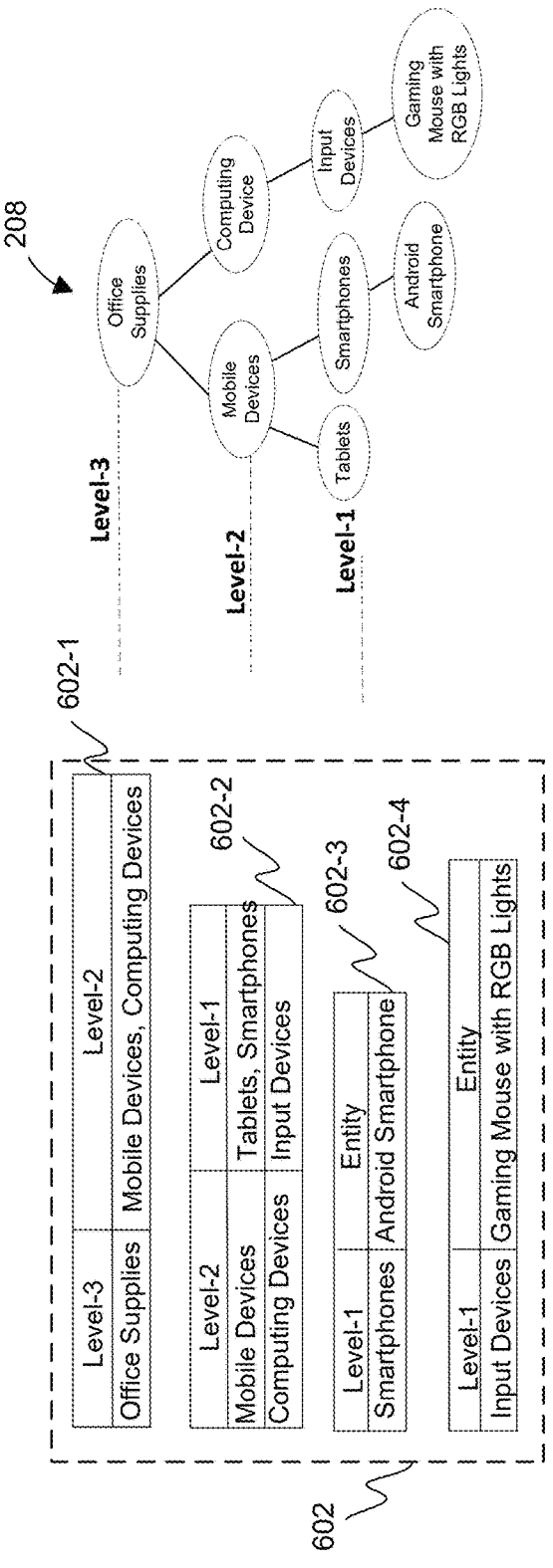
FIG. 6 shows an exemplary block diagram of the existing hierarchical structure in a tabular format.

FIG. 6 shows an exemplary diagram 600 of the existing hierarchical structure 102 in tabular format. The hierarchical structure 102 may be provided in a CSV file or spreadsheet e.g., representing a tabular structure 602 or a tree-like structure (e.g., 206, or 208). The tabular structure 602 may correspond to the hierarchical structure 208, depicting the hierarchy levels as hierarchy tables e.g., 602-1, 602-2, 602-3, and 602-4. For example, the hierarchy name, "Office Supplies" in the hierarchical structure 208 can be depicted as hierarchy table 602-1 in FIG. 6. The hierarchy levels underneath "Office Supplies" can be placed in a next column as shown in hierarchy table 602-1. It is to be noted that the hierarchy levels can be mere logical assignments and may vary in various disclosure. The intention is not to limit the scope of the disclosure. The entities can also be named as nodes from hereon after. In a tree-like hierarchical structure 208, the nodes can be categorized into intermediate nodes and end nodes. For example, the entities, "Android Smartphone" and "Gaming Mouse with RGB Lights" can be categorized as end nodes. A tabular structure 602 can be constructed considering the above discussed rules to categorize entities.

The number of entities at a specific hierarchy level often corresponds to the number of rows in its associated tabular structure. For example, in the hierarchical structure 208, "Mobile Devices" are positioned at hierarchy Level-2, with the subsequent column lists subsequent hierarchy level (i.e., Level-1) including hierarchy names, such as "Tablets" and "Smartphones". New entities, for the specific exemplary hierarchical structure 208, may be incorporated into the hierarchical structure 208 as leaf nodes at Level-1 of the hierarchy and are reflected in the corresponding tabular structure as tables 602-3 and 602-4.

Figure 7:
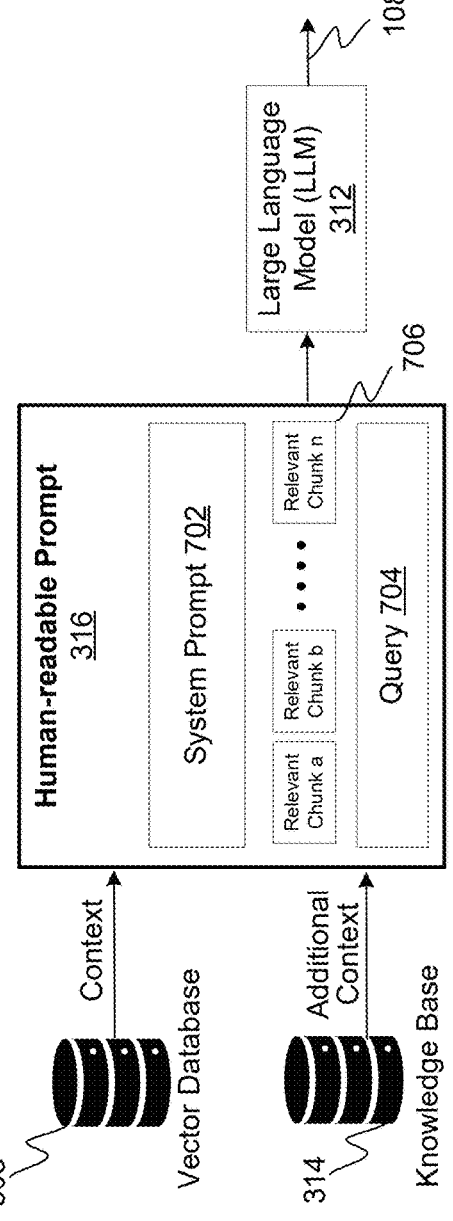
FIG. 7 illustrates an exemplary block diagram of a human-readable prompt, generated by retrieval-augmented generation (RAG).

FIG. 7 illustrates an exemplary block diagram 700 of a human-readable prompt 316, generated by the retrieval-augmented generation (RAG) 310. Auto-assignment techniques 106 may update (or suggest) a hierarchical structure 102 based on a query 704, which may include adding or modifying entities within the hierarchical structure 102. When a query is submitted, the auto-assignment techniques 106 may gather relevant data to accurately process the query and generate appropriate and relevant response to it. This is done by leveraging a retrieval-augmented generation RAG 310 that retrieves the context from a vector database 308, where the hierarchical structure 102 is stored. The hierarchical structure 102 may be input in a CSV file format or as a spreadsheet. In some aspects, each row of the CSV file represents one level of the hierarchical structure 102 that may be processed by chunking module 402, generating smaller and relevant chunks for it. Each of these chunks may be represented by an embedding vector, enabling efficient retrieval. When the query 704 is processed, the RAG 310 may retrieve these relevant chunks (relevant chunks a, . . . , n) 706 from the vector database 308 and directly associate or augment with the hierarchical structure 102, providing the context for understanding and responding to the query 704.

In addition to retrieving these relevant chunks a, . . . , n 706, RAG 310 may also retrieve additional context from the knowledge base 314 that may include supplementary information that may not be part of the hierarchical structure 102 stored in the vector database 308. With the relevant chunks from the vector database that may contribute to building the context and the additional context from the knowledge base 314, the RAG 310 may generate a system prompt 702. The system prompt 702 may include instructions for large language model (LLM) 312 to generate or update the hierarchical structure 102 based on the one or more new entities that are mentioned in the query 704. The human-readable prompt 31 may include relevant chunks, the context from the hierarchical structure 102, additional context from the knowledge base 314 and the system prompt 702. Subsequently, the human-readable prompt 316 is given as input to large language model 312, that processes different information elements, included in the prompt, to generate an updated or suggested structure 108, which includes the one or more new entities as specified in the query 704. This process may enable that the updated (or suggested) hierarchical structure 108 is contextually accurate, as it leverages not only specific hierarchical details retrieved from vector database 308 but also the relevant logic from similar technologies is included in knowledge base 314.

Figure 8:
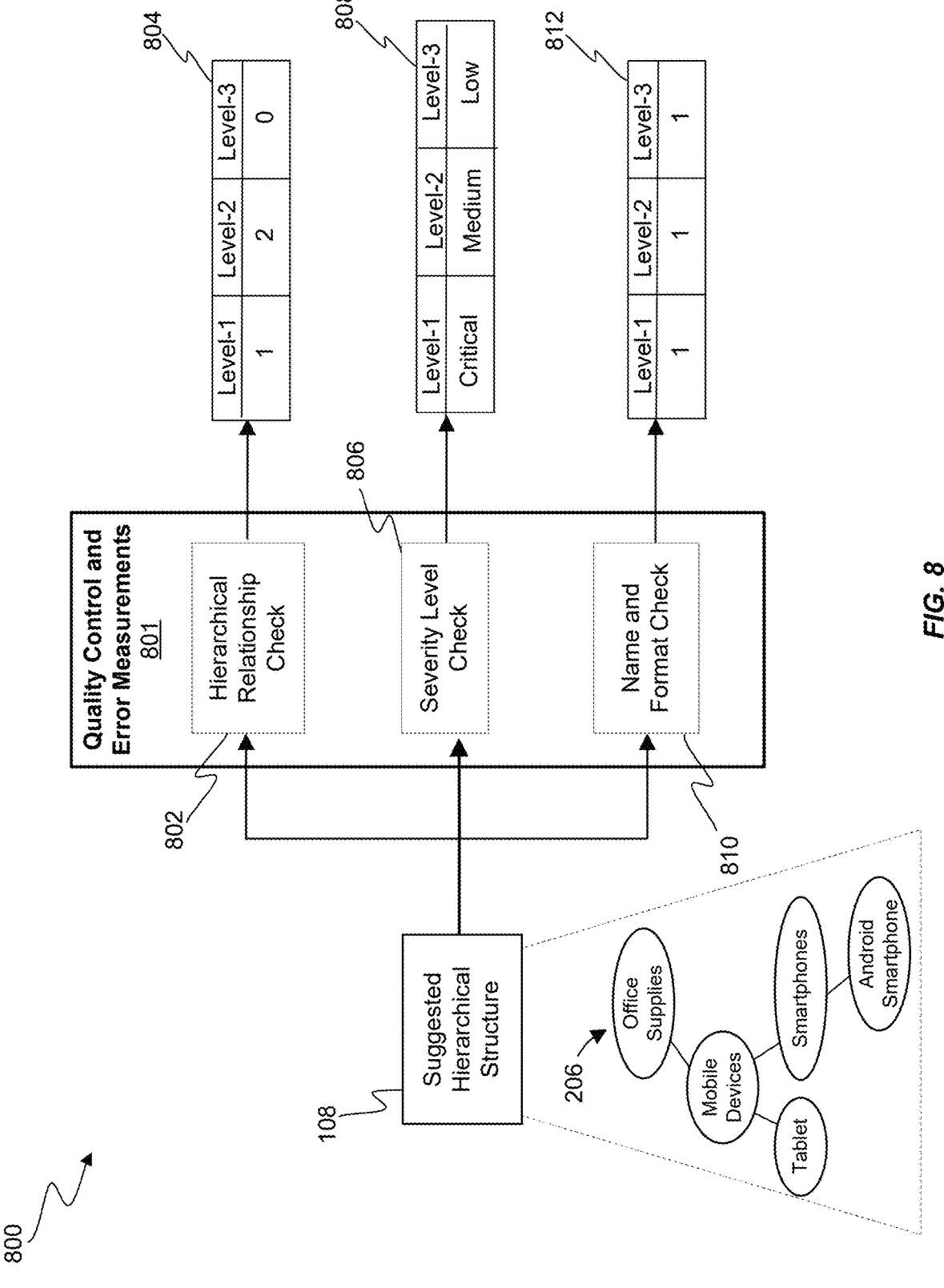
FIG. 8 illustrates exemplary evaluation results, including quality control and error measurements for the suggested hierarchical structure.

FIG. 8 illustrates exemplary evaluation results 800 (also referred to as 112 in the FIG. 1), including quality control and error measurements 801, for a suggested hierarchical structure 108. Evaluation results 800 may include a hierarchical relationship check 802, determining the validity and accuracy of one or more hierarchical paths, in suggested hierarchical structure 108 108 corresponding to a query 704 of adding a new entity. For example, for adding a new entity "Android Smartphone" to the hierarchical structure 204, a suggested hierarchy path from the highest level (the most generalized one) to the lowest hierarchy level (the most specialized one) may be: "Office Supplies (Level-3)→Mobile Devices (Level-2)→Smartphones (Level-1)". Therefore, first a new entity "smartphone" at Level-1 may be added underneath an existing entity "mobile device" at Level-2, and then a new entity "Android Smartphone" may be added under the entity "Smartphones" at Level-1 in the suggested hierarchy path. Consequently, the corresponding evaluation table 804 shows errors in relationships between different levels (i.e., entities do not have a semantic relationship among them). For example, evaluation table 804 lists a result value '0' at Level-3, indicating no relationship error, a '2' to Level-2, indicating a relationship error of the current hierarchy level (i.e., Level-2) with the lower hierarchy level (i.e., Level-1). Similarly, the evaluation table 804 shows '1' for Level-1, indicating a suggested new hierarchy level "Smartphones" that did not exist before at this current level.

In some aspects, suggested hierarchical structure 108 can be evaluated for a severity level check 806 to determine the impact of different errors generated in a hierarchical structure. Severity levels may categorize errors into different critical levels based on predefined criteria, ranging from "none", "low", "medium", "high", to "critical". In the context of evaluating a hierarchical structure evaluation, severity levels may help prioritize which issues need immediate attention based on the assessment made about the criticality level of errors on the correctness of a suggested hierarchical structure 108 (e.g., "critical" might be assigned to hierarchical structural failures, "medium" for mere formatting issues). The results of severity level check 806 for suggested hierarchical structure 206 are tabulated in table 808, showing "Critical" for Level-1 indicating that a new entity is added at this level that needs a review by the user whether to accept or reject the suggestion. For Level-2, severity level is assigned "Medium", while Level 3 has a level assigned as "Low", which indicates no error.

Similarly, suggested hierarchical structure 108 may be evaluated for a name and format check 810 i.e., in a suggested hierarchical path for a given new entity, it may be checked whether the hierarchy names or formats are accurate at each hierarchy level within the hierarchy path.) For example, if there are non-alphabetic characters (e.g., '@', '#', '/') or misspelled names in one or more hierarchy levels, then evaluation table 812, for an example hierarchical structure 206, may tabulate results of name and format check 810. After identifying name and formatting errors at a the one or more hierarchy levels, the corresponding hierarchy names may be auto-corrected or processed to generate a proposed correction (e.g., in a post-processing phase) following the logic where the suggested hierarchy name is close enough to an existing hierarchy name at its level, such as. "mob-DEVICES" (suggested) may be replaced by "Mobile Devices" (e.g., following existing hierarchy formatting and naming convention). In evaluation table 812, a result value of '0' for a level indicates name or formatting errors exists at that level; while a result value of '1' indicates no name or formatting errors exist.

Figure 9:
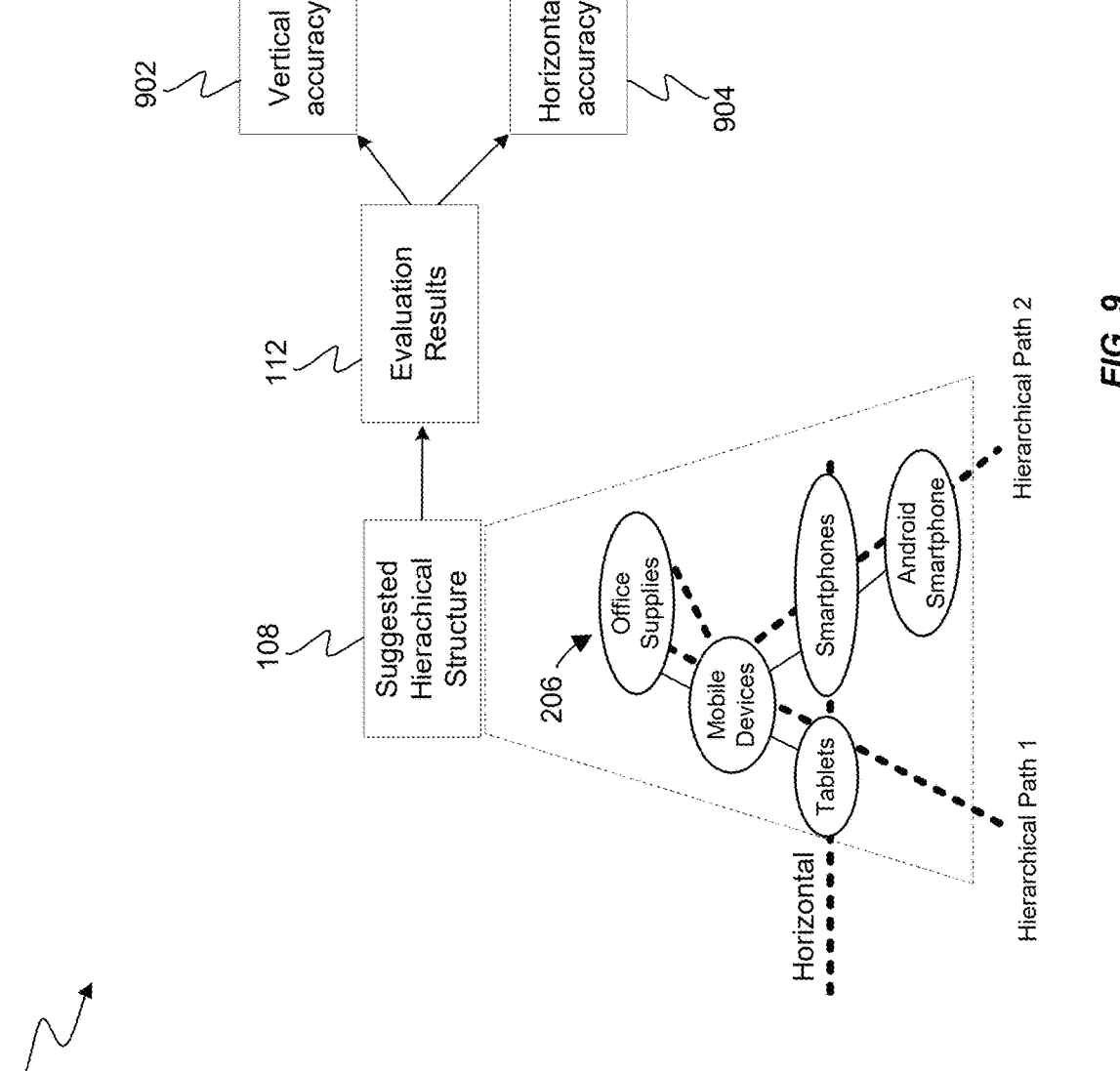
FIG. 9 illustrates another example of evaluation results including horizontal and vertical accuracy of the suggested hierarchical structure.

FIG. 9 illustrates another example of evaluation results including vertical accuracy 902 and horizontal accuracy 904 of the suggested hierarchical structure 108. For an example hierarchical structure 206, vertical accuracy 902 measures the success rate of correctly assigning each new entity to a hierarchical path, from the highest hierarchical level to the lowest hierarchical level or vice versa. The vertical accuracy measures the number of valid hierarchical paths (from the most specific levels to the most generic level), after each entity of one or more new entities are added to the example hierarchical structure 206. A valid hierarchical path within a hierarchical structure may refer to a sequence of hierarchical levels or nodes that accurately reflects the hierarchical relationships without errors or inconsistencies. Horizontal accuracy 904 measures, at a given hierarchical level only, the number of entities that are correctly assigned to the given hierarchical level. For example, in evaluating the exemplary suggested hierarchical structure 206, the vertical accuracy associated with addition of a new entity, "Android Smartphone" may be determined by assessing the vertical accuracy of the suggested hierarchical path "Office Supplies→Mobile Devices→Smartphones". This evaluation may result in a vertical accuracy score of (2/3*100)=67%, indicating that, of the three hierarchical levels, one level (i.e., Level-1) is incorrectly related, such as the erroneous relationship between "Office Supplies" and "Mobile Devices." In alternative examples, vertical accuracy can be computed by counting the number of valid paths after adding a new entity relative to the total number of paths. For example, in hierarchical structure 206, if there are two paths and both are valid, the vertical accuracy is 100%. Similarly, the horizontal accuracy for a given hierarchical level, say Level-1 of an example hierarchical structure 206, may be measured by evaluating whether entities "Tablets" and "Smartphones" are correctly assigned to Level-1 below a generic entity "Mobile Devices". Since both entities are correctly assigned to Level-1, as their relationships with "Mobile Devices" are valid; therefore, the horizonal accuracy of Level-1 is 100%.

FIG. 10 illustrates an exemplary workflow 1000 of a method for adding one or more new entities 104 to an existing hierarchical structure 102. The blocks in workflow 1000 are illustrated in a specific order, while the order can be modified, for example, some blocks may be performed before other, and some blocks may be performed simultaneously. The blocks can be performed by hardware, software, or a combination thereof. At block 1005, a user may provide a user input that may include a hierarchical structure and a query for adding one or more new entities. An existing hierarchical structure 102 can be provided in the form of a comma-separated value file or a spreadsheet, where the hierarchical structure may comprise one or more hierarchy levels, which are assigned hierarchy names, such that a plurality of entities may be arranged to appropriate levels by following with specific rules to categorize the plurality of entities and then assign them to appropriate levels. At block 1010, the existing hierarchical structure 102 may be split into a set of chunks based on predefined criteria. The predefined criteria can be character separators or delimiters such as commas, semi-colons, spaces, cells, rows or columns. An overlapping among the set of chunks can be allowed for an efficient performance of the auto-assignment techniques 106.

For each chunk from the set of chunks, the auto-assignment techniques 106, at block 1010, may generate an embedding vector 306 that may capture the hierarchy levels, hierarchy names, semantic meanings and/or categorization rules of the existing hierarchical structure 102 by leveraging an embedding model 304. These embedding vectors 306 may be stored in a vector database 308, or a database that is hosted by a cloud service provider to enable online database services. The auto-assignment techniques 106 may perform similar processing for generating one or more new embedding vectors 306 associated with the one or more new entities 104, using the embedding model 304, at block 1015. At block 1020, for each new embedding vector associated with a given query, the retrieval-augmented generation (RAG) 310 may generate a context based on its relevance to the given query. Retrieval-augmented generation RAG 310 may compare each new embedding vector with the stored embedding vectors that are associated with relevant chunks, as a consequence, it retrieves relevant embedding vectors based on a similarity metric (e.g., distance or a cosine similarity) if it exceeds a certain threshold value.

At block 1025, an additional context may be generated from a knowledge base 314 including data from external sources that are not incorporated in the training of a generative AI model such as a large language model 312. Retrieval-augmented generation RAG 310 may utilize a given query comprising one or more new entities, a context from an existing hierarchical structure 102 and additional context from knowledge base 314, and a system prompt 702 to generate a human-readable prompt 316, at block 1030. System prompt 702 may include instructions to the generative AI model for generating a suggested hierarchical structure. This human-readable prompt 316, may be provided to the generative (AI) model to suggest or generate one or more hierarchical paths for each new entity, at block 1035. Finally, the auto-assignment techniques 106 may output a suggested hierarchical structure 108 including hierarchical paths associated with new entities, at block 1040.

Figure 11:
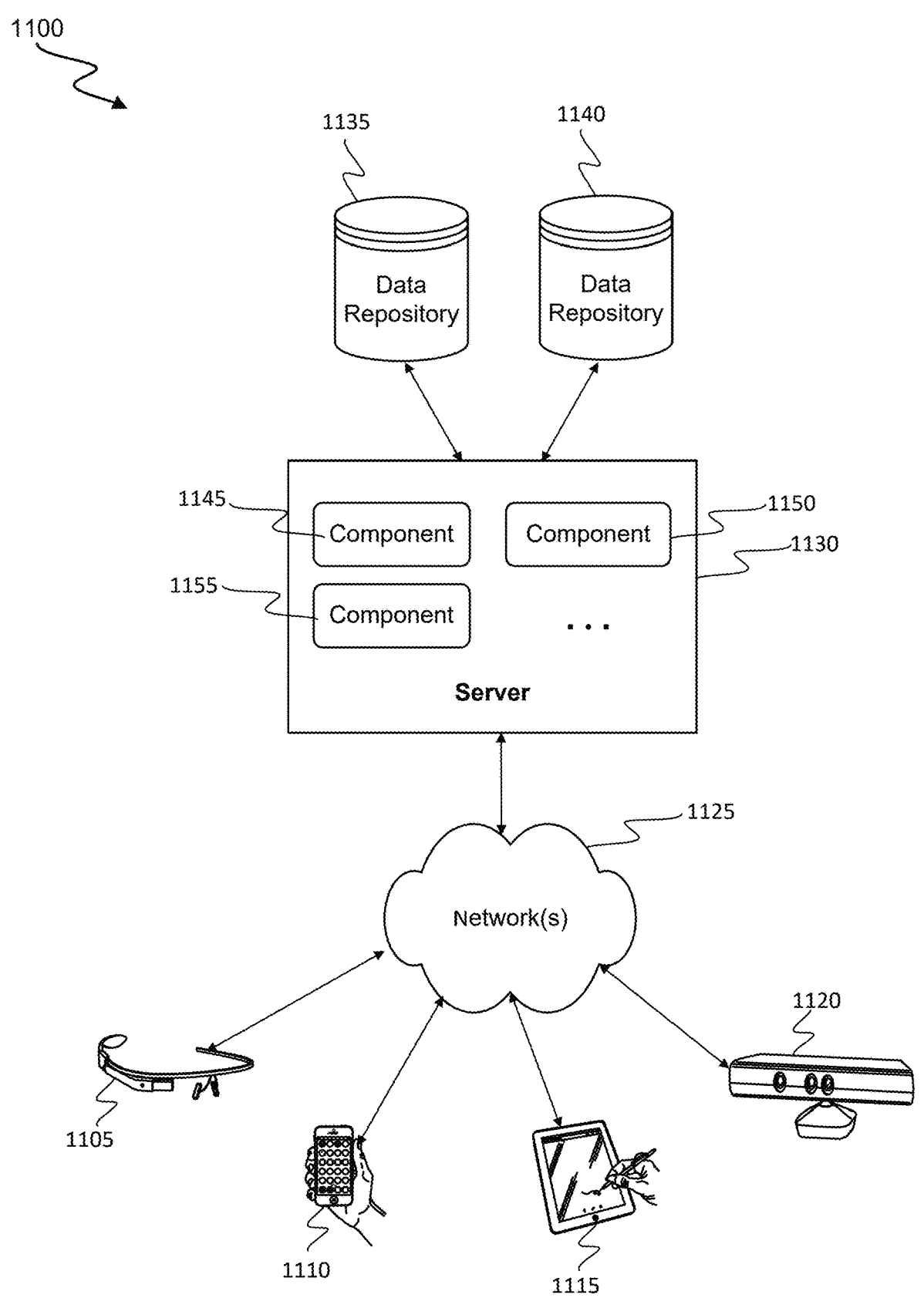
FIG. 11 depicts a simplified diagram of a distributed system through which user inputs can be made in accordance with some aspects of the present disclosure.

FIG. 11 depicts a simplified diagram of a distributed system 1100 through which user inputs can be made. In the illustrated disclosure, distributed system 1100 may include one or more client computing devices 1105, 1110, 1115, and 1120, coupled to a server 1130 via one or more network(s) 1125. Client computing devices 1105, 1110, 1115, and 1120 may comprise of one or more computer systems and may be configured to execute one or more applications. In various aspects, server 1130 may be adapted to run one or services or software applications that enable techniques for auto-assignment of one or more new entities 104. In certain aspects, server 1130 may also provide other services or software applications that can include non-virtual and virtual environments. In some respects, these services may be offered as web-based or cloud services, such as under a Software as a Service (SaaS) model to the users of client computing devices 1105, 1110, 1115, or 1120. Users operating client computing devices 1105, 1110, 1115, or 1120 may, in turn, utilize one or more subject applications to interact with server 1130. Furthermore, client computing devices 1105, 1110, 1115, or 1120 may, in turn, utilize one or more subject applications to provide entity names to be assigned in the hierarchical structure.

In the configuration depicted in FIG. 11, server 1130 may include one or more components 1145, 1150, and 1155 that implement the functions performed by server 1130. These components may include software components that may be executed by one or more processors, hardware components, or combinations thereof. It may be appreciated that various system configurations are possible, which may be different from distributed system 1100. The embodiment shown in FIG. 11 is thus one example of a distributed system for implementing an embodiment system and is not intended to be limiting. Users may use client computing devices 1105, 1110, 1115, or 1120 for providing user input including existing hierarchical structure 102 and the new entities 104 to the server 1130 according to the teachings of this disclosure. A computing device may provide an interface that enables a user to interact with the computing device. The computing device may also output information to the user via this interface. Although FIG. 11 depicts only four client computing devices, any number of client computing devices may be supported.

The client computing devices may include various types of computing systems such as portable handheld devices, general purpose computers such as personal computers and laptops, workstation computers, wearable devices, gaming systems, thin subjects, various messaging devices, sensors or other sensing devices, and the like. These client computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head-mounted displays and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The subject devices may be capable of executing various applications such as various Internet-related applications and communication applications (e.g., E-mail applications, short message service (SMS) applications) and may use various communication protocols.

Network(s) 1125 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1125 can be a Local Area Network (LAN), network based on Ethernet, Token-Ring, a Wide-Area Network (WAN), the Internet, a virtual network, a Virtual Private Network (VPN), an intranet, an extranet, a Public Switched Telephone Network (PSTN), an infra-red network, a wireless network (e.g., a network operating under any of the Institute of Electrical and Electronics (IEEE) 1002.11 suite of protocols, Bluetooth®, or any other wireless protocol), or any combination of these or other networks.

Server 1130 may include one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1130 can include one or more virtual machines running virtual operating systems, or other computing architectures involving virtualization such as one or more flexible pools of logical storage devices that can be virtualized to maintain virtual storage devices for the server. In various aspects, server 1130 may be adapted to run one or more services or software applications that provide the functionality described in the foregoing disclosure.

The computing systems of server 1130 may run one or more operating systems including any of those discussed above, as well as any commercially available server operating system. Server 1130 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation, those commercially available from Oracle®, Microsoft®, Sybase®, IBM® (International Business Machines), and the like.

In some implementations, server 1130 may include one or more applications to implement various aspects of the disclosure to auto-assign entity names provided by the user through various client computing devices e.g., 1105 to 1120. The entity names or entity images of FIG. 1 may include data of various forms such as text data, an image, or combination of text and images. As an example, the new entities 104 are text or image that may include but are not limited to, Twitter® feeds, Facebook® updates, or real-time updates received from one or more third-party information sources and continuous data streams, which may include real-time events related to sensor data applications, financial tickers, network performance measuring tools (e.g., network monitoring and traffic management applications), click-stream analysis tools, automobile traffic monitoring, and the like. Server 1130 may also include one or more applications to display the output of various processes of computer-implemented method via one or more display devices of client computing devices 1105, 1110, 1115, and 1120.

Distributed system 1100 may also include one or more databases 1135, and 1140. These databases may be used to store data in database and other information in certain aspects. Databases 1135, and 1140 may reside in a variety of locations. For example, a data repository used by server 1130 may be local to server 1130 or may be remote from server 1130 and in communication with server 1130 via a network-based or dedicated connection. Databases 1135, and 1140 may be of different types. In certain aspects, a data repository used by server 1130 may be a database, for example, a relational database, such as databases provided by Oracle Corporation® and other vendors. One or more of these databases may be adapted to enable storage, update, and retrieval of data to and from the database in response to Structured Query Language (SQL) formatted commands.

In certain aspects, one or more databases 1135, and 1140 may also be used by applications to store application data. The databases used by applications may be of different types such as, for example, a key-value store repository, an object store repository, or a general storage repository supported by a file system. In certain aspects, the techniques for auto-assigning entity names in the existing hierarchical structure 102 may be offered as services via a cloud environment.

Figure 12:
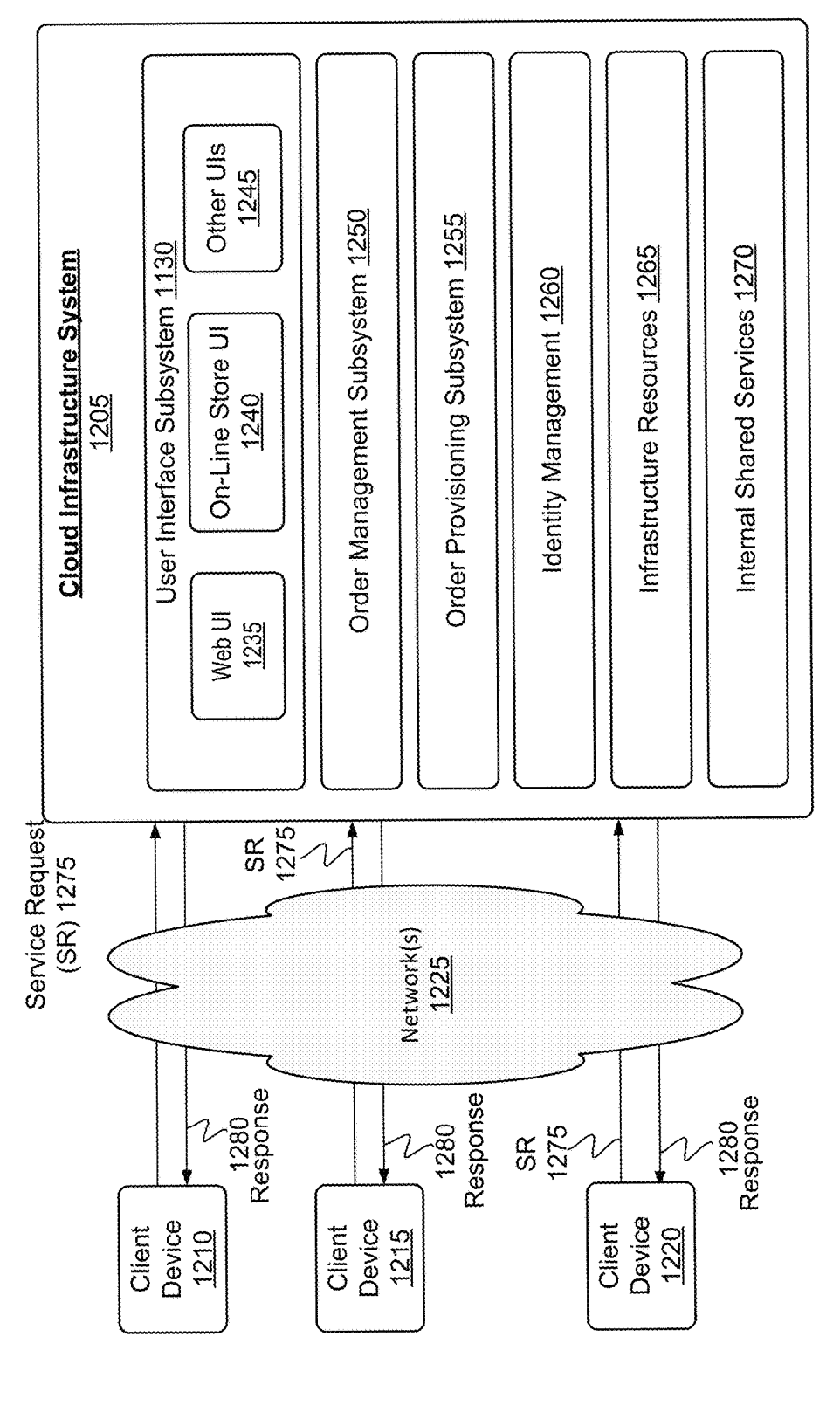
FIG. 12 illustrates various components of a cloud infrastructure system.

The embodiment depicted in FIG. 12 is only one example of a cloud infrastructure system and is not intended to be limiting. It should be appreciated that, in some other respects, cloud infrastructure system 1205 may have more or fewer components than those depicted in FIG. 12, may combine two or more components, or may have a different configuration or arrangement of components. For example, although FIG. 12 depicts three client computing devices, any number of client computing devices may be supported in alternative aspects. The term cloud service is generally used to refer to a service that is made available to users on demand and via a communication network such as the Internet by systems (e.g., cloud infrastructure system 1205) of a service provider. Typically, in a public cloud environment, servers and systems that make up the cloud service provider's system may be different from the subject's own on-premises servers and systems. The cloud service provider's systems are managed by the cloud service provider. Subjects can thus avail themselves of cloud services provided by a cloud service provider without having to purchase separate licenses, support, or hardware and software resources for the services. For example, a cloud service provider's system may host an application, and a user may, via a network 1225 (e.g., the Internet), on demand, order and use the application without the user having to buy infra-structure resources for executing the application. Cloud services are designed to provide easy, scalable access to applications, resources, and services. Several providers offer cloud services. For example, several cloud services are offered by Oracle Corporation® of Redwood Shores, California, such as middleware services, database services, Java cloud services, and others.

In certain aspects, cloud infrastructure system 1205 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1205 may include a suite of applications, middleware, databases, or other resources that enable the provision of the various cloud services.

A SaaS model enables an application or software to be delivered to a subject over a communication network like the Internet, as a service, without the subject having to buy the hardware or software for the underlying application. For example, a SaaS model may be used to provide subjects access to on-demand applications that are hosted by cloud infrastructure system 1205. Examples of SaaS services provided by Oracle Corporation® include, without limitation, various services for human resources/capital management, subject relationship management (CRM), enterprise resource planning (ERP), supply chain management (SCM), enterprise performance management (EPM), analytics services, social applications, and others. An IaaS model is generally used to provide infrastructure resources (e.g., servers, storage, hardware, and networking resources) to a subject as a cloud service to provide elastic compute and storage capabilities. Various IaaS services are provided by Oracle Corporation®.

A PaaS model is generally used to provide, as a service, platform, and environment resources that enable subjects to develop, run, and manage applications and services without the subject having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others. Cloud services are generally provided on an on-demand self-service basis, subscription-based, elastically scalable, reliable, highly available, and secure manner. For example, a subject, via a subscription order, may order one or more services provided by cloud infrastructure system 1205. Cloud infra-structure system 1205 may perform processing to provide the services requested in the subject's subscription order. Cloud infrastructure system 1205 may be configured to provide one or even multiple cloud services.

Cloud infrastructure system 1205 may provide cloud services via different deployment models. In a public cloud model, cloud infrastructure system 1205 may be owned by a third-party cloud services provider and the cloud services are offered to any general public subject, where the subject can be an individual or an enterprise. In certain other aspects, under a private cloud model, cloud infrastructure system 1205 may be operated within an organization (e.g., within an enterprise organization) and services provided to subjects that are within the organization. For example, the subjects may be various departments of an enterprise, such as the Human Resources department, the payroll department, etc. or even individuals within the enterprise. In certain other aspects, under a community cloud model, the cloud infrastructure system 1205 and the services provided may be shared by several organizations in a related community. Various other models, such as hybrids of the above-mentioned models may also be used.

Client computing devices 1210, 1215, and 1220 may be of several types (such as 1105, 1110, 1115, and 1120 depicted in FIG. 11) and may be capable of operating one or more user applications. A user may use a computing device to interact with cloud infrastructure system 1205, such as to request a service provided by cloud infrastructure system 1205. As depicted in the embodiment in FIG. 12, cloud infrastructure system 1205 may include infrastructure resources 1265 that can be utilized for facilitating the provision of various cloud services offered by cloud infrastructure system 1205. Infrastructure resources 1265 may include, for example, processing resources, storage or memory resources, networking resources, and the like.

In certain aspects, to facilitate efficient provisioning of these resources for supporting the various cloud services provided by cloud infrastructure system 1205 for different subjects, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1205 may itself internally shared services 1270 that are shared by different components of cloud infrastructure system 1205 and which facilitate the provisioning of services by cloud infrastructure system 1205. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 1205 may comprise multiple subsystems. These subsystems may be implemented in software, or hardware, or combinations thereof. As depicted in FIG. 12, the subsystems may include a user interface subsystem 1230 that enables users or subjects of cloud infrastructure system 1205 to interact with cloud infrastructure system 1205. User interface subsystem 1230 may include various interfaces such as a web interface 1235, an online store interface 1240 where cloud services provided by cloud infrastructure system 1205 are advertised and are purchasable by a consumer, and other interfaces 1245. For example, a subject may, using a computing device e.g., 1105, request (service request 1275) one or more services provided by cloud infrastructure system 1205 using one or more of interfaces 1235, 1240, and 1245. For example, a subject may access the online store, browse cloud services offered by cloud infrastructure system 1205, and place a subscription order for one or more services offered by cloud infrastructure system 1205 that the subject wishes to subscribe to. The service request may include information identifying the subject and one or more services that the subject desires to subscribe to. For example, a subject may place a subscription order for a Chabot related service offered by cloud infrastructure system 1205. As part of the order, the subject may provide information identifying for input (e.g., utterances).

In certain aspects, such as the embodiment depicted in FIG. 12, cloud infrastructure system 1205 may comprise an order management subsystem (OMS) 1250 that is configured to process the new order. Once properly validated, OMS 1250 may invoke order provisioning subsystem (OPS) 1255 that is configured to provision resources for the order including processing, memory, and networking resources. The provisioning may include allocating resources for the order and configuring the resources to facilitate the service requested by the subject order. The manner in which resources are provisioned for an order and the type of the provisioned resources may depend upon the type of cloud service that has been ordered by the subject. For example, according to one workflow, OPS 1255 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting subject for providing the requested service.

Cloud infrastructure system 1205 may send a response or notification 1290 to the requesting subject to indicate when the requested service is now ready for use. In some instances, information (e.g., a link) may be sent to the subject that enables the subject to start using and availing the benefits of the requested services. Cloud infrastructure system 1205 may provide services to multiple subjects. For each subject, cloud infrastructure system 1205 is responsible for managing information related to one or more subscription orders received from the subject, maintaining subject data related to the orders, and providing the requested services to the subject. Cloud infrastructure system 1205 may also collect usage statistics regarding a subject's use of subscribed services. For example, statistics may be collected for the amount of storage used, the amount of data transferred, the number of users, and the amount of system up time and system down time, and the like.

Cloud infrastructure system 1205 may provide services to multiple subjects in parallel. Cloud infrastructure system 1205 may store information for these subjects, including possibly proprietary information. In certain aspects, cloud infrastructure system 1205 comprises an identity management subsystem. Identity management subsystem (IMS) 1260 may be configured to manage the subject's information and provide the separation of the managed information such that information related to one subject is not accessible by another subject. IMS 1260 may be configured to provide various security-related services such as identity services, such as information access management, authentication and authorization services, services for managing subject identities and roles and related capabilities, and the like. Although specific aspects have been described, various modifications, alterations, alternative constructions, and equivalents are possible. Embodiments are not restricted to operation within certain specific data processing environments but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Figure 13:
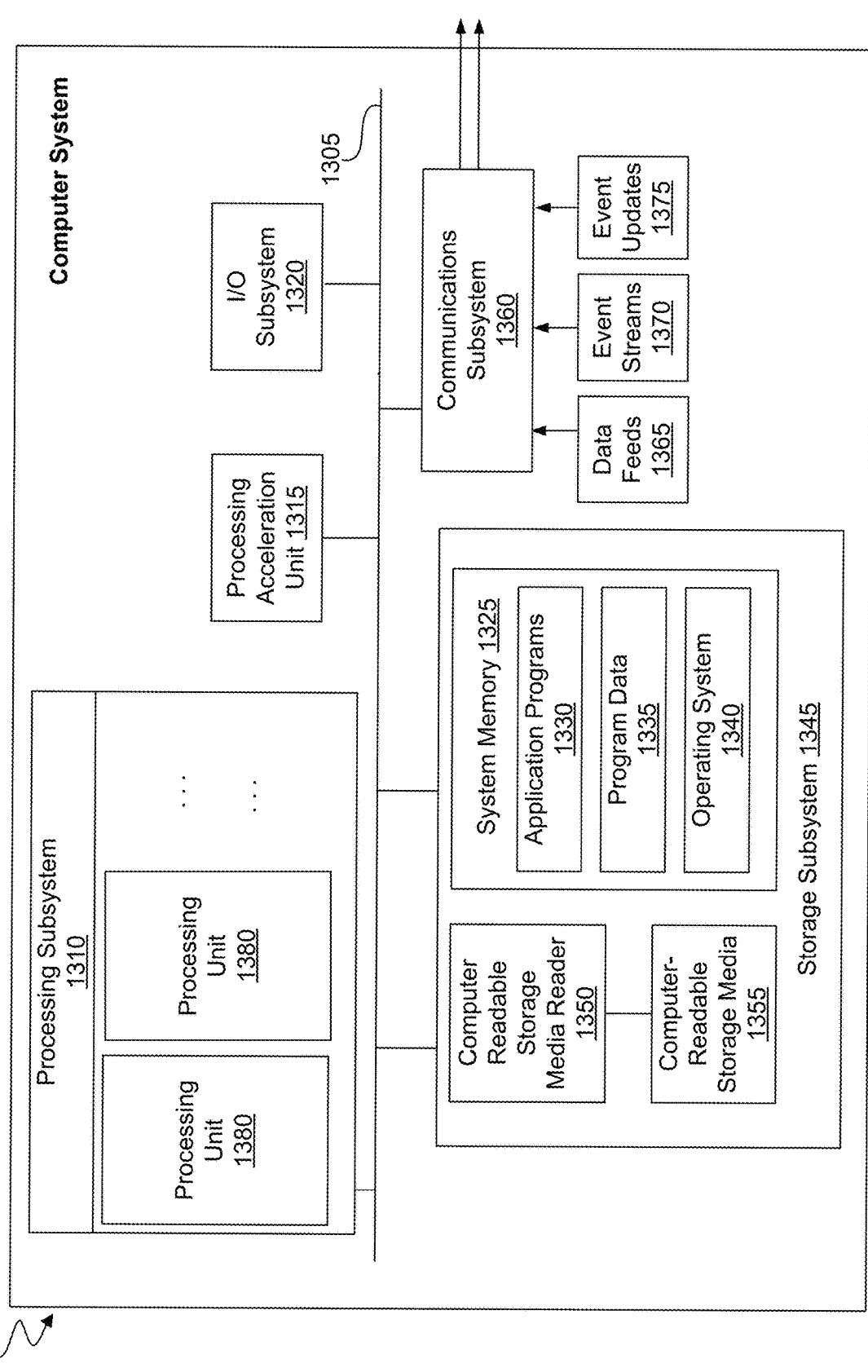
FIG. 13 illustrates an exemplary computer system that may be used to implement certain aspects of the disclosed techniques.

FIG. 13 illustrates an exemplary computer system 1300 that may be used to implement certain aspects of the disclosed techniques for auto-assignment of new entities. As shown in FIG. 13, computer system 1300 includes various subsystems including a processing subsystem 1310 that communicates with a few other subsystems via a bus subsystem 1305. These other subsystems may include a processing acceleration unit 1315, and I/O subsystem 1320, a storage subsystem 1345, and a communications subsystem 1360. Storage subsystem 1345 may include non-transitory computer-readable storage media including storage media 1355 and a system memory 1325.

Bus subsystem 1305 provides a mechanism for letting the various components and subsystems of computer system 1300 communicate with each other as intended. Although bus subsystem 1305 is shown schematically as a single bus, alternative aspects of the bus subsystem may utilize multiple buses. Bus subsystem 1305 may be any of several types of bus structures including a memory bus or memory controller, a peripheral bus, a local bus using any of a variety of bus architectures, and the like. For example, such architectures may include an Industry Standard Architecture (ISA) bus, a Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P13127.1 standard, and the like.

Processing subsystem 1310 controls the operation of computer system 1300 and may comprise one or more processors, Application Specific Integrated Circuits (ASICs), or Field Programmable Gate Arrays (FPGAs). The processors may include single-core, or multicore processors. The processing resources of computer system 1300 can be organized into one or more processing units 1390, 1380, etc. A processing unit may include one or more processors, one or more cores from the same or different processors, a combination of cores and processors, or other combinations of cores and processors. In some embodiments, processing subsystem 1310 can include one or more special-purpose co-processors such as graphics processors, digital signal processors (DSPs), or the like. In some embodiments, some or all of the processing units of processing subsystem 1310 can be implemented using customized circuits, such as ASICs, or FPGAs.

In some embodiments, the processing units in processing subsystem 1310 can execute instructions stored in system memory 1325 or on computer-readable storage media 1355. In various aspects, the processing units can execute a variety of programs or code instructions and can maintain multiple concurrently executing programs or processes. At any given time, some, or all of the program code to be executed can be resident in system memory 1325 and/or on computer-readable storage media 1355 including potentially on one or more storage devices. Through suitable programming, processing subsystem 1310 can provide various functionalities described above. In instances where computer system 1300 is executing one or more virtual machines, one or more processing units may be allocated to each virtual machine. In certain aspects, a processing acceleration unit 1315 may optionally be provided for performing customized processing or for off-loading some of the processing performed by processing subsystem 1310 to accelerate the overall processing performed by computer system 1300.

I/O subsystem 1320 may include devices and mechanisms for inputting information to computer system 1300 and/or for outputting information from or via computer system 1300. In general, use of the term input device is intended to include all possible types of devices and mechanisms for inputting information to computer system 1300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 370 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 1300 to a user or other computer. User interface output devices may include a display subsystem, indicator lights, or non-visual displays such as audio output devices, etc. The display subsystem may be a Cathode Ray Tube (CRT), a flat-panel device, such as that using a Liquid Crystal Display (LCD) or plasma display, a projection device, a touch screen, and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 1345 provides a repository or data store for storing information and data that is used by computer system 1300. Storage subsystem 1345 provides a tangible non-transitory computer-readable storage medium for storing the basic programming and data constructs that provide the functionality of some aspects. Storage subsystem 1345 may store software (e.g., programs, code modules, instructions) that, when executed by processing subsystem 1310 provides the functionality described above. The software may be executed by one or more processing units of processing subsystem 1310. Storage subsystem 1345 may also provide a repository for storing data used in accordance with the teachings of this disclosure.

Storage subsystem 1345 may include one or more non-transitory memory devices, including volatile and non-volatile memory devices. As shown in FIG. 13, storage subsystem 1345 includes a system memory 1325 and a computer-readable storage media 1355. System memory 1325 may include a number of memories including a volatile main random-access memory (RAM) for storage of instructions and data during program execution and a non-volatile Read Only Memory (ROM) or flash memory in which fixed instructions are stored. In some implementations, a basic input/output system (BIOS), containing the basic routines that help to transfer information between elements within computer system 1300, such as during start-up, may typically be stored in the ROM. The RAM typically contains data and/or program modules that are presently being operated and executed by processing subsystem 1310. In some implementations, system memory 1325 may include multiple different types of memory, such as Static Random Access Memory (SRAM), Dynamic Random Access Memory (DRAM), and the like.

By way of example, and not limitation, as depicted in FIG. 13, system memory 1325 may load application programs 1330 that are being executed, which may include various applications such as Web browsers, mid-tier applications, Relational Database Management Systems (RDBMS), etc., program data 1335, and an operating system 1340. By way of example, operating system 1340 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1355 may store programming and data constructs that provide the functionality of some aspects. Computer-readable media 1355 may provide storage of computer-readable instructions, data structures, program modules, and other data for computer system 1300. Software (programs, code modules, instructions) that, when executed by processing subsystem 1310 provides the functionality described above, may be stored in storage subsystem 1345. By way of example, computer-readable storage media 1355 may include non-volatile memory such as a hard disk drive, a magnetic disk drive, an optical disk drive such as a CD ROM, Digital Video Disc (DVD), a Blu-Ray® disk, or other optical media. Computer-readable storage media 1355 may include, but is not limited to, Zip® drives, flash memory cards, Universal Serial Bus (USB) flash drives, secure digital (SD) cards, DVD disks, digital video tape, and the like. Computer-readable storage media 1355 may also include, Solid-State Drives (SSD) based on non-volatile memory such as flash-memory based SSDs, enterprise flash drives, solid state ROM, and the like, SSDs based on volatile memory such as solid state RAM, dynamic RAM, static RAM, Dynamic Random Access Memory (DRAM)-based SSDs, magneto resistive RAM (MRAM) SSDs, and hybrid SSDs that use a combination of DRAM and flash memory based SSDs.

In certain aspects, storage subsystem 1345 may also include a computer-readable storage media reader 1350 that can further be connected to computer-readable storage media 1355. Reader 1350 may receive and be configured to read data from a memory device such as a disk, a flash drive, etc.

In certain aspects, Computer System 1300 may support virtualization technologies, including but not limited to the virtualization of processing and memory resources. For example, computer system 1300 may provide support for executing one or more virtual machines. In certain aspects, Computer System 1300 may execute a program such as a hypervisor that facilitates the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1300. Accordingly, multiple operating systems may potentially be run concurrently by Computer System 1300.

Communications subsystem 1360 provides an interface to other computer systems and networks. Communications subsystem 1360 serves as an interface for receiving data from and transmitting data to other systems from computer system 1300. For example, communications subsystem 1360 may enable computer system 1300 to establish a communication channel to one or more subject devices via the Internet for receiving and sending information from and to the subject devices. For example, the communication subsystem may be used to transmit a response to a user regarding the inquiry for a Chabot.

Communication subsystem 1360 may support both wired and/or wireless communication protocols. For example, in certain aspects, communications subsystem 1360 may include Radio Frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 1202.XX family standards, or other mobile communication technologies, or any combination thereof), Global Positioning System (GPS) receiver components, and/or other components. In some aspects communications subsystem 1360 can provide wired network connectivity (e.g., Ethernet) in addition to or instead of a wireless interface.

Communication subsystem 1360 can receive and transmit data in various forms. For example, in some embodiments, in addition to other forms, communications subsystem 1360 may receive input communications in the form of structured and/or unstructured data feeds 1365, event streams 1370, event updates 1375, and the like. For example, communications subsystem 1360 may be configured to receive (or send) data feeds 1365 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 1360 may be configured to receive data in the form of continuous data streams, which may include event streams 1370 of real-time events and/or event updates 1375, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1360 may also be configured to communicate data from computer system 1300 to other computer systems or networks. The data may be communicated in various forms such as structured and/or unstructured data feeds 1365, event streams 1370, event updates 1375, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 1300 depicted in FIG. 13 is intended only as a specific example. Many other configurations having more or fewer components than the system depicted in FIG. 13 are possible. Based on the disclosure and teachings provided herein, a person of ordinary skill in art can appreciate other ways and/or methods to implement the various aspects.

Although specific aspects have been described, various modifications, alterations, alternative constructions, and equivalents are possible. Embodiments are not restricted to operation within certain specific data processing environments but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation, such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method including: receiving a user input that includes a hierarchical structure and a query for adding one or more new entities to the hierarchical structure, wherein the hierarchical structure comprises hierarchy levels that are assigned hierarchy names in which a plurality of entities is arranged with associated categorization rules, and wherein:

the one or more new entities include image data received in real-time from a continuous data stream by one or more data sources, and the image data in the one or more new entities is processed using an image identification model to generate an entity name of a new entity;

generating, by leveraging an embedding model, an embedding vector for each chunk of a set of chunks that are obtained by splitting the hierarchical structure based on predefined criteria, wherein embedding vectors associated with the set of chunks capture the hierarchy names, the hierarchy levels, semantic meanings and the associated categorization rules within the hierarchical structure;

generating one or more new embedding vectors associated with the one or more new entities by leveraging the embedding model;

generating, for each new embedding vector of the one or more new embedding vectors, a context via a retrieval-augmented generation, based on a relevance to the query;

generating, via the retrieval-augmented generation, an additional context from a knowledge base that comprises data from one or more external sources that were not included in training of a generative artificial intelligence model;

augmenting, using a processing subsystem within a cloud infrastructure system, the query with a system prompt, the context from the hierarchical structure and the additional context from the knowledge base to generate a human-readable prompt, wherein the system prompt includes instructions to the generative artificial intelligence model for generating a suggested hierarchical structure;

inputting the human-readable prompt to the generative artificial intelligence model to generate, for each new entity of the one or more new entities, one or more suggested hierarchical paths, wherein the new entity of the one or more new entities having the entity name is correctly placed at a hierarchy level in the one or more suggested hierarchical paths by following the associated categorization rules;

generating, based on the generative artificial intelligence model, the suggested hierarchical structure incorporating the one or more suggested hierarchical paths associated with the one or more new entities in the suggested hierarchical structure, wherein the suggested hierarchical structure is displayed on one or more display devices; and generating a provenance information that includes references to one or more information sources used by the generative artificial intelligence model to provide the suggested hierarchical structure.

2. The computer-implemented method of claim 1, further including:

generating, for the new entity of one or more new entities, the one or more suggested hierarchical paths that includes a hierarchy extension by adding a new hierarchy name at one or more hierarchical levels, when the generative artificial intelligence model does not find an appropriate placement of the new entity in the one or more suggested hierarchical paths.

3. The computer-implemented method of claim 1, wherein generating the context for each new embedding vector of the one or more new embedding vectors using the retrieval-augmented generation includes:

retrieving a vector database that stores the embedding vectors associated with the set of chunks;

identifying one or more relevant embedding vectors by comparing each new embedding vector of the one or more new embedding vectors to the stored embedding vectors that have the relevance to the query above a particular similarity threshold value; and extracting one or more chunks associated with the one or more relevant embedding vectors to generate the context.

4. The computer-implemented method of claim 1, further including:

generating a provenance information that includes references to one or more information sources that the generative artificial intelligence model used to generate the suggested hierarchical structure.

5. The computer-implemented method of claim 1, further including:

generating evaluation results by performing validations for each suggested hierarchical path of the one or more suggested hierarchical paths corresponding to each new entity of the one or more new entities, wherein the validations include:

assessing whether a hierarchy name associated with each hierarchy level of one or more hierarchy levels of each suggested hierarchical path of the one or more suggested hierarchical paths, is valid;

auto-correcting, based on the assessment, the hierarchy name that is found invalid;

checking whether each hierarchy level of each suggested hierarchical path of the one or more suggested hierarchical paths has a correct relationship with neighboring hierarchy levels within the suggested hierarchical path; and evaluating a severity of an error of each suggested hierarchical path of the one or more suggested hierarchical paths associated with the one or more new entities.

6. The computer-implemented method of claim 1, further comprising generating evaluation results that comprise:

a vertical accuracy that measures a success rate of correctly placing each new entity of the one or more new entities in each suggested hierarchical path of the one or more suggested hierarchical paths; and a horizontal accuracy that measures a success rate at each hierarchy level of each suggested hierarchical path of the one or more suggested hierarchical paths in the suggested hierarchical structure.

7. The computer-implemented method of claim 1, wherein the hierarchical structure is in a comma-separated value (CSV) or a spreadsheet file format.

8. A system comprising:

one or more data processors; and a non-transitory computer readable storage medium containing instruction which, when executed on the one or more data processors, cause the one or more data processors to perform a set of operations including:

receiving a user input that includes a hierarchical structure and a query for adding one or more new entities to the hierarchical structure, wherein the hierarchical structure comprises hierarchy levels that are assigned hierarchy names in which a plurality of entities is arranged with associated categorization rules, and wherein:

the one or more new entities include image data received in real-time from a continuous data stream by one or more data sources, and the image data in the one or more new entities is processed using an image identification model to generate an entity name of a new entity;

generating, by leveraging an embedding model, an embedding vector for each chunk of a set of chunks that are obtained by splitting the hierarchical structure based on predefined criteria, wherein embedding vectors associated with the set of chunks capture the hierarchy names, the hierarchy levels, semantic meanings and the associated categorization rules within the hierarchical structure;

generating one or more new embedding vectors associated with the one or more new entities by leveraging the embedding model;

generating, for each new embedding vector of the one or more new embedding vectors, a context via a retrieval-augmented generation, based on a relevance to the query;

generating, via the retrieval-augmented generation, an additional context from a knowledge base that comprises data from one or more external sources that were not included in training of a generative artificial intelligence model;

augmenting, using a processing subsystem within a cloud infrastructure system that includes the one or more data processors, the query with a system prompt, the context from the hierarchical structure and the additional context from the knowledge base to generate a human-readable prompt, wherein the system prompt includes instructions to the generative artificial intelligence model for generating a suggested hierarchical structure;

inputting the human-readable prompt to the generative artificial intelligence model to generate, for each new entity of the one or more new entities, one or more suggested hierarchical paths, wherein the new entity of the one or more new entities having the entity name is correctly placed at a hierarchy level in the one or more suggested hierarchical paths by following the associated categorization rules;

generating, based on the generative artificial intelligence model, the suggested hierarchical structure incorporating the one or more suggested hierarchical paths associated with the one or more new entities in the suggested hierarchical structure, wherein the suggested hierarchical structure is displayed on one or more display devices; and generating a provenance information that includes references to one or more information sources used by the generative artificial intelligence model to provide the suggested hierarchical structure.

9. The system of claim 8, wherein the set of operations further includes:

generating, for the new entity of one or more new entities, the suggested hierarchy path that includes a hierarchy extension by adding a new hierarchy name at one or more hierarchy levels, when the generative artificial intelligence model does not find an appropriate placement of the new entity.

10. The system of claim 8, wherein generating the context for each new embedding vector of the one or more new embedding vectors using the retrieval-augmented generation includes:

retrieving a vector database that stores the embedding vectors associated with the set of chunks;

identifying one or more relevant embedding vectors by comparing each new embedding vector to the stored embedding vectors that have the relevance to the query above a particular similarity threshold; and extracting one or more chunks associated with the one or more relevant embedding vectors to generate the context.

11. The system of claim 8, wherein the set of operations further includes:

generating a provenance information that includes references to one or more sources that the embedding AI model used to generate the suggested hierarchical structure.

12. The system of claim 8, wherein the set of operations further includes:

generating evaluation results by performing validations for each suggested hierarchical path corresponding to each new entity of the one or more new entities, wherein the validations include:

assessing whether a hierarchy name associated with each hierarchy level within the suggested hierarchical path, is valid;

auto-correcting, based on the assessment, the hierarchy name that is found invalid;

checking whether each hierarchy level has a correct relationship with neighboring hierarchy levels within the suggested hierarchical path; and evaluating a severity of an error within the suggested hierarchy paths associated with the one or more new entities.

13. The system of claim 8, wherein the set of operations further includes generating evaluation results that comprise:

a vertical accuracy that measures a success rate of correctly placing each new entity in the suggested hierarchical path; and a horizontal accuracy that measures a success rate at each hierarchy level in the suggested hierarchical structure.

14. The system of claim 8, wherein the hierarchical structure is in a comma-separated value (CSV) or a spreadsheet file format.

15. A computer-program product tangibly embodied in a non-transitory machine-readable storage medium, including instructions configured to cause one or more data processors to perform to perform a set of operations comprising:

receiving a user input that includes a hierarchical structure and a query for adding one or more new entities to the hierarchical structure, wherein the hierarchical structure comprises hierarchy levels that are assigned hierarchy names in which a plurality of entities is arranged with associated categorization rules, and wherein:

the one or more new entities include image data received in real-time from a continuous data stream by one or more data sources, and the image data in the one or more new entities is processed using an image identification model to generate an entity name of a new entity;

generating, by leveraging an embedding model, an embedding vector for each chunk of a set of chunks that are obtained by splitting the hierarchical structure based on predefined criteria, wherein embedding vectors associated with the set of chunks capture the hierarchy names, the hierarchy levels, semantic meanings and the associated categorization rules within the hierarchical structure;

generating one or more new embedding vectors associated with the one or more new entities by leveraging the embedding model;

generating, for each new embedding vector of the one or more new embedding vectors, a context via a retrieval-augmented generation, based on a relevance to the query;

generating, via the retrieval-augmented generation, an additional context from a knowledge base that comprises data from one or more external sources that were not included in training of a generative artificial intelligence model;

augmenting, using a processing subsystem within a cloud infrastructure system that includes the one or more data processors, the query with a system prompt, the context from the hierarchical structure and the additional context from the knowledge base to generate a human-readable prompt, wherein the system prompt includes instructions to the generative artificial intelligence model for generating a suggested hierarchical structure;

inputting the human-readable prompt to the generative artificial intelligence model to generate, for each new entity of the one or more new entities, one or more suggested hierarchical paths, wherein the new entity of the one or more new entities having the entity name is correctly placed at a hierarchy level in the one or more suggested hierarchical paths by following the associated categorization rules;

generating, based on the generative artificial intelligence model, the suggested hierarchical structure incorporating the one or more suggested hierarchical paths associated with the one or more new entities in the suggested hierarchical structure, wherein the suggested hierarchical structure is displayed on one or more display devices; and generating a provenance information that includes references to one or more information sources used by the generative artificial intelligence model to provide the suggested hierarchical structure.

16. The computer-program product of claim 15, wherein the set of operations further includes:

generating, for the new entity of one or more new entities, the suggested hierarchy path that includes a hierarchy extension by adding a new hierarchy name at one or more hierarchy levels, when the generative artificial intelligence model does not find an appropriate placement of the new entity.

17. The computer-program product of claim 15, wherein generating the context for each new embedding vector of the one or more new embedding vectors using the retrieval-augmented generation includes:

retrieving a vector database that stores the embedding vectors associated with the set of chunks;

identifying one or more relevant embedding vectors by comparing each new embedding vector to the stored embedding vectors that have the relevance to the query above a particular similarity threshold; and extracting one or more chunks associated with the one or more relevant embedding vectors to generate the context.

18. The computer-program product of claim 15, wherein the set of operations further includes:

generating a provenance information that includes references to one or more sources that the generative artificial intelligence model used to generate the suggested hierarchical structure.

19. The computer-program product of claim 15, wherein the set of operations further includes:

generating evaluation results by performing validations for each suggested hierarchical path corresponding to each new entity of the one or more new entities, wherein the validations include:

assessing whether a hierarchy name associated with each hierarchy level within the suggested hierarchical path, is valid;

auto-correcting, based on the assessment, the hierarchy name that is found invalid;

checking whether each hierarchy level has a correct relationship with neighboring hierarchy levels within the suggested hierarchical path; and evaluating a severity of an error within the suggested hierarchy paths associated with the one or more new entities.

20. The computer-program product of claim 15, wherein the set of operations further includes generating evaluation results that comprise:

a vertical accuracy that measures a success rate of correctly placing each new entity in the suggested hierarchical path; and a horizontal accuracy that measures a success rate at each hierarchy level in the suggested hierarchical structure.

\* \* \* \* \*